United States Patent
Hashimoto et al.

(10) Patent No.: US 11,886,629 B2
(45) Date of Patent: Jan. 30, 2024

(54) HEAD-MOUNTED INFORMATION PROCESSING APPARATUS AND ITS CONTROLLING METHOD

(71) Applicant: MAXELL, LTD., Kyoto (JP)

(72) Inventors: Yasunobu Hashimoto, Kyoto (JP); Naohisa Takamizawa, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 17/617,995

(22) PCT Filed: Jun. 13, 2019

(86) PCT No.: PCT/JP2019/023483
§ 371 (c)(1),
(2) Date: Dec. 10, 2021

(87) PCT Pub. No.: WO2020/250377
PCT Pub. Date: Dec. 17, 2020

(65) Prior Publication Data
US 2022/0308658 A1    Sep. 29, 2022

(51) Int. Cl.
G06F 3/01 (2006.01)
G06F 3/03 (2006.01)
G06F 3/0346 (2013.01)

(52) U.S. Cl.
CPC ............ G06F 3/011 (2013.01); G06F 3/0304 (2013.01); G06F 3/0346 (2013.01)

(58) Field of Classification Search
CPC ........ G06F 3/011; G06F 3/012; G06F 3/0304; G06F 3/0346; G06F 3/014; G06F 2203/0331
See application file for complete search history.

(56) References Cited

U.S. PATENT DOCUMENTS

2011/0199303 A1* 8/2011 Simpson ............... G06F 3/0346
345/158
2015/0258431 A1   9/2015 Stafford et al.
(Continued)

FOREIGN PATENT DOCUMENTS

JP    2015-146058 A    8/2015
JP    2017-516185 A    6/2017
(Continued)

OTHER PUBLICATIONS

International Search Report of PCT/JP2019/023483 dated Sep. 10, 2019.

*Primary Examiner* — Amare Mengistu
*Assistant Examiner* — Sarvesh J Nadkarni
(74) *Attorney, Agent, or Firm* — Mattingly & Malur, PC

(57) ABSTRACT

Provided are a head-mounted information processing apparatus capable of improving user's convenience, and its controlling method. Therefore, it includes a main body device 2 used in a state of being worn on a user's head, and a controller used in a state of being worn on a user's wrist or hand and controlling the main body device. For example, a directional detector 91 in the main body device 2 detects a controller's direction by calculation based on a detected result of a position/attitude sensor of the controller. A rotational detector 92 detects controller's rotation, which uses the direction of the controller as a rotational axis, by calculation based on the detected result of the position/attitude sensor of the controller. An operation instruction converter 87 converts detected results of the directional detector 91 and the rotational detector 92 into instructions for the main body device 2.

7 Claims, 17 Drawing Sheets

(56) References Cited

U.S. PATENT DOCUMENTS

2016/0213978 A1    7/2016  Ban et al.
2018/0217681 A1*  8/2018  Hiroi .................. G06F 3/04892
2019/0146598 A1    5/2019  Peri

FOREIGN PATENT DOCUMENTS

| JP | 2017-120575 A | 7/2017 |
| JP | 2018-508251 A | 3/2018 |
| JP | 2018-124651 A | 8/2018 |
| JP | 2019-012154 A | 1/2019 |

* cited by examiner

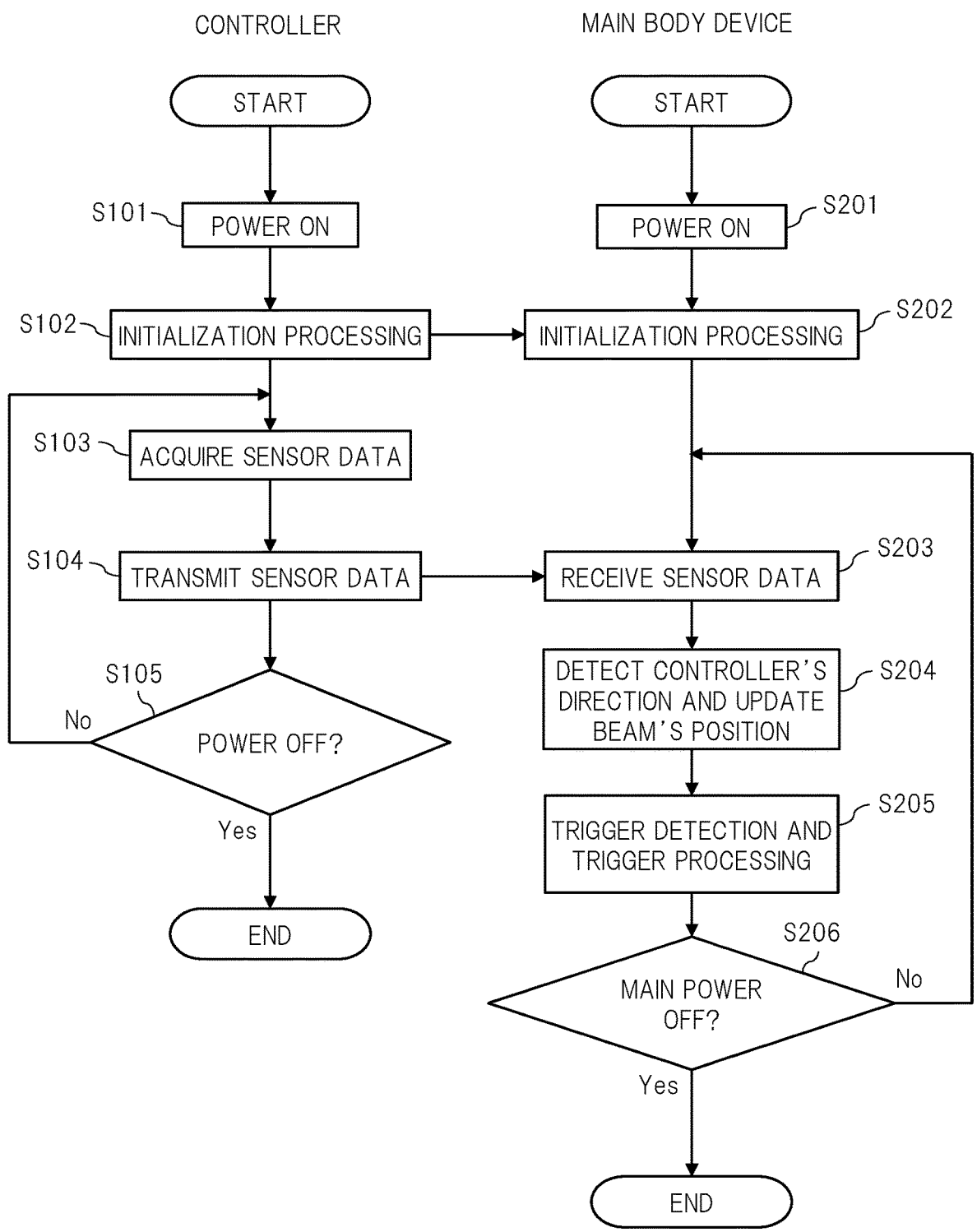

CONTROLLER COORDINATE SYSTEM

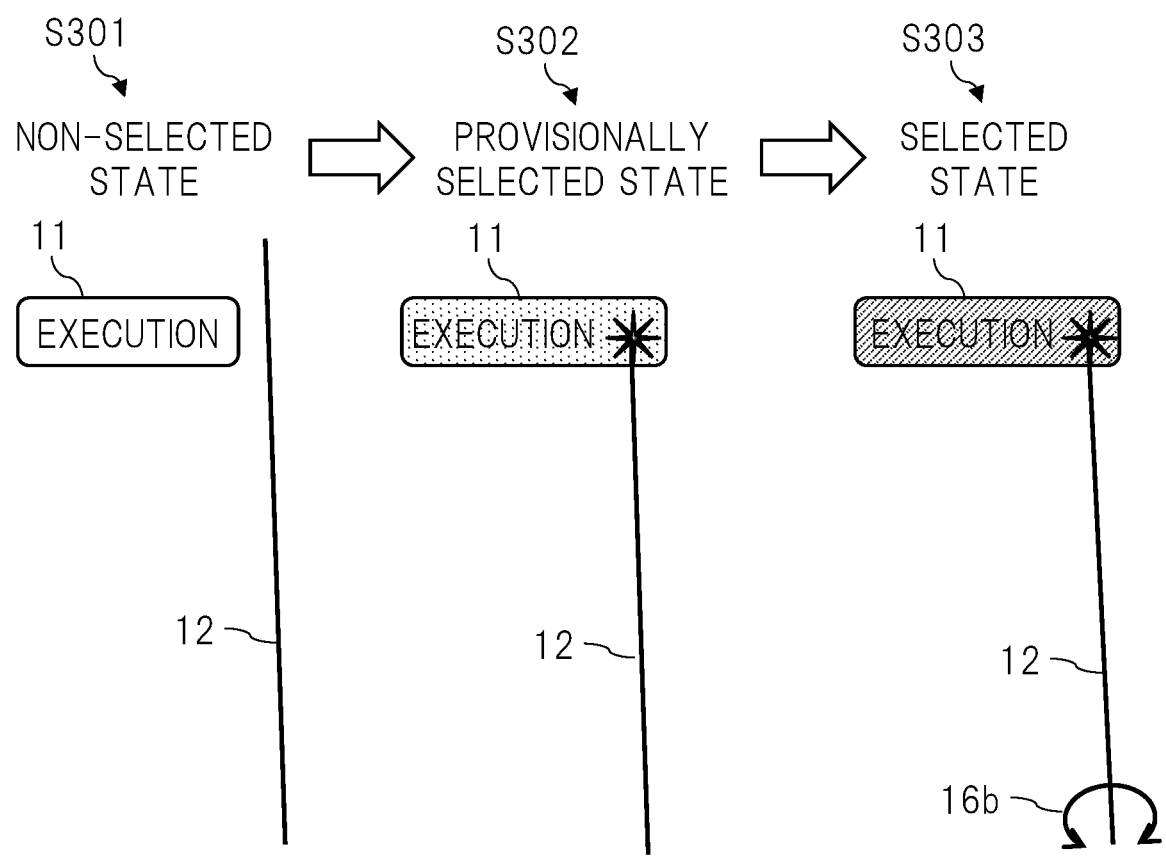

HEAD-MOUNTED INFORMATION PROCESSING APPARATUS AND ITS CONTROLLING METHOD

TECHNICAL FIELD

The present invention relates to a head-mounted information processing apparatus and its controlling method, and to a technique for controlling the head-mounted information processing apparatus by a controller.

BACKGROUND ART

Shown in Patent Document 1 is a method in which a camera is installed in each wearable device worn around both wrists, and gestures of both hands are recognized by acquiring respective pieces of image data of a right hand and a left hand with the left-hand and right-hand cameras. Further, when it is determined that the acquired image data does not indicate a position of the hand, a method of determining a position of the wearable device by using an inertial sensor installed in each wearable device is shown.

RELATED ART DOCUMENTS

Patent Documents

Patent Document 1: Japanese Patent Application Laid-open No. 2017-516185

SUMMARY OF THE INVENTION

Problems to be Solved by the Invention

The head-mounted information processing apparatus, which is also called an HMD (Head Mounted Display), is used while being worn on a user's head, and can display augmented reality (AR) information and virtual reality (VR) information, etc. on a display. In such a head-mounted information processing apparatus (hereinafter, may be abbreviated as HMD), while holding an HMD attached controller in a user's hand, a user may control the HMD via the controller.

However, in this case, the user's hand may be blocked by the controller, which makes it difficult to use the hand freely. As a result, convenience of the user may deteriorate.

The present invention has been made in view of the above, and one of its objects is to provide a head-mounted information processing apparatus capable of improving user's convenience and its controlling method.

The above and other purposes and novel features of the present invention will become apparent from the description of the present specification and the accompanying drawings.

Means for Solving the Problems

A brief outline of typical one of the inventions disclosed in the present application will be described as follows.

A typical head-mounted information processing apparatus has a main body device that is used in a state of being worn on a user's head, and a controller that is used in a state of being worn on a user's wrist or hand and that controls the main body device. The controller has a proximity communication interface that communicates with the main body device, and a position/attitude sensor that detects a position/attitude of the controller. The main body device has a proximity communication interface that communicates with the controller, and a display that displays a predetermined image. The controller or the main body device has a directional detector, a rotational detector, and an operation instruction converter. The directional detector detects a direction of the controller by calculation based on a detected result of the position/attitude sensor. The rotational detector detects rotation of the controller by calculation based on the detected result of the position/attitude sensor, the direction of the controller being used as a rotational axis regarding the rotation of the controller.

The operation instruction converter converts a detected result of the directional detector and a detected result of the rotational detector into instructions for the main device.

Effects of the Invention

If an effect obtained by representative one of the inventions disclosed in the present application is briefly described, it is to be able to improve the user's convenience in the head-mounted information processing apparatus.

BRIEF DESCRIPTION OF THE DRAWINGS

FIG. 7 is a flowchart showing an example of a schematically controlling method in the head-mount information processing apparatus of FIG. 5;

FIG. 11 is a view showing an example of a display mode of a pointing beam displayed onto a display by a display controller of FIG. 6B;

DETAILED DESCRIPTION OF PREFERRED EMBODIMENTS

Figure 1:
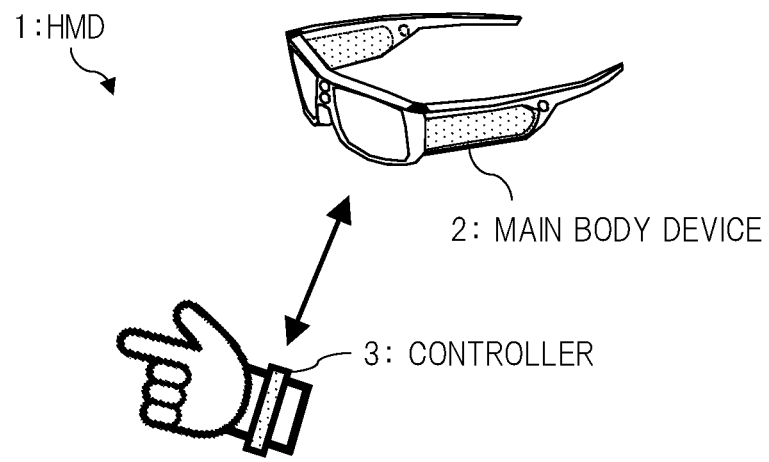
FIG. 1 is a schematic view showing an outline example of a head-mounted information processing apparatus according to a first embodiment of the present invention.

Hereinafter, embodiments of the present invention will be described in detail with reference to the drawings. Incidentally, in all the drawings for explaining the embodiments, the same members are denoted in principle by the same reference numerals, and a repetitive description thereof will be omitted.

First Embodiment

<<Outline of HMD>>

FIG. 1 is a schematic view showing an outline example of a head-mounted information processing apparatus according to a first embodiment of the present invention. FIGS. 2(a) and 2(b) are schematic views each showing a different outline example of a controller in FIG. 1. A head-mounted information processing apparatus (HMD) 1 of FIG. 1 includes a main body device 2 and a controller 3. The main body device 2 is used in a state of being worn on a user's head, and can display augmented reality (AR) information, virtual reality (VR) information, and the like on a display. As a displaying method at this time, a VR type (non-transparent type), an MR type (transparent type), or the like is known. The controller 3 is used in a state of being worn on a user's wrist or hand (for example, in a wound state), and controls the main body device 2 according to a user's operation.

Figure 2:
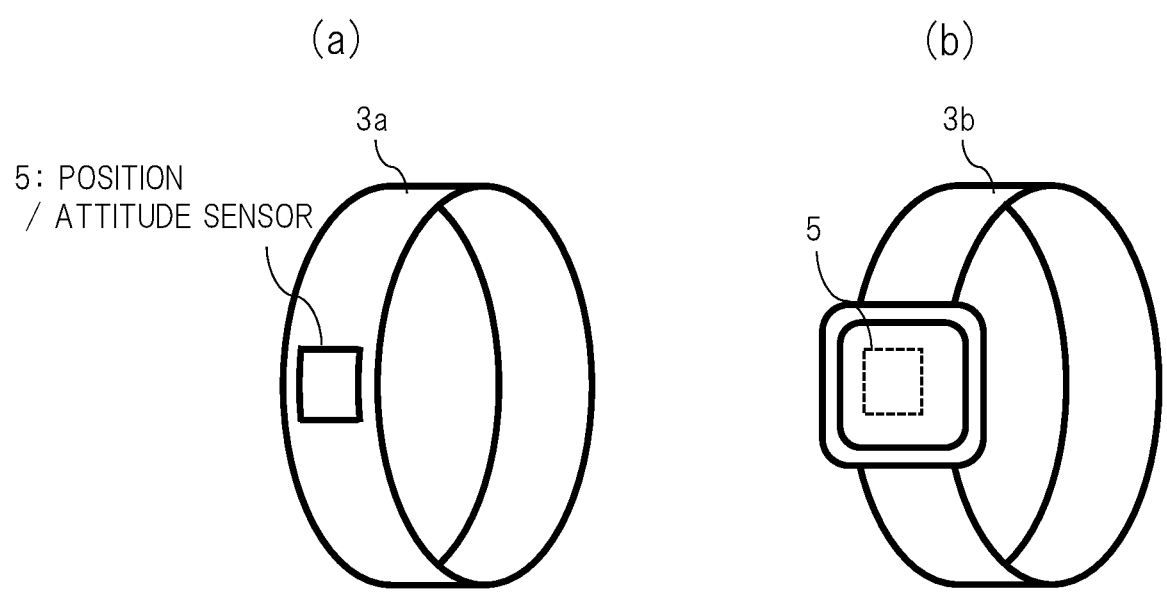
FIG. 2(a) and FIG. 2(b) are schematic views each showing a different outline example of a controller in FIG. 1.

The controller 3 may be a wristband type controller 3a that is a dedicated component attached to the HMD 1 as shown in FIG. 2 (a), a general-purpose watch-type portable information terminal (so-called a smart watch) as shown FIG. 2 (b), or the like. In any case, the controller 3 includes at least a position/attitude sensor 5 for detecting a position/attitude of the controller 3, and a communicator (not shown) for communicating with the main body device 2. Further, in a case of FIG. 2(b), software for controlling the main body device 2 is incorporated in the controller 3b.

Figure 3:
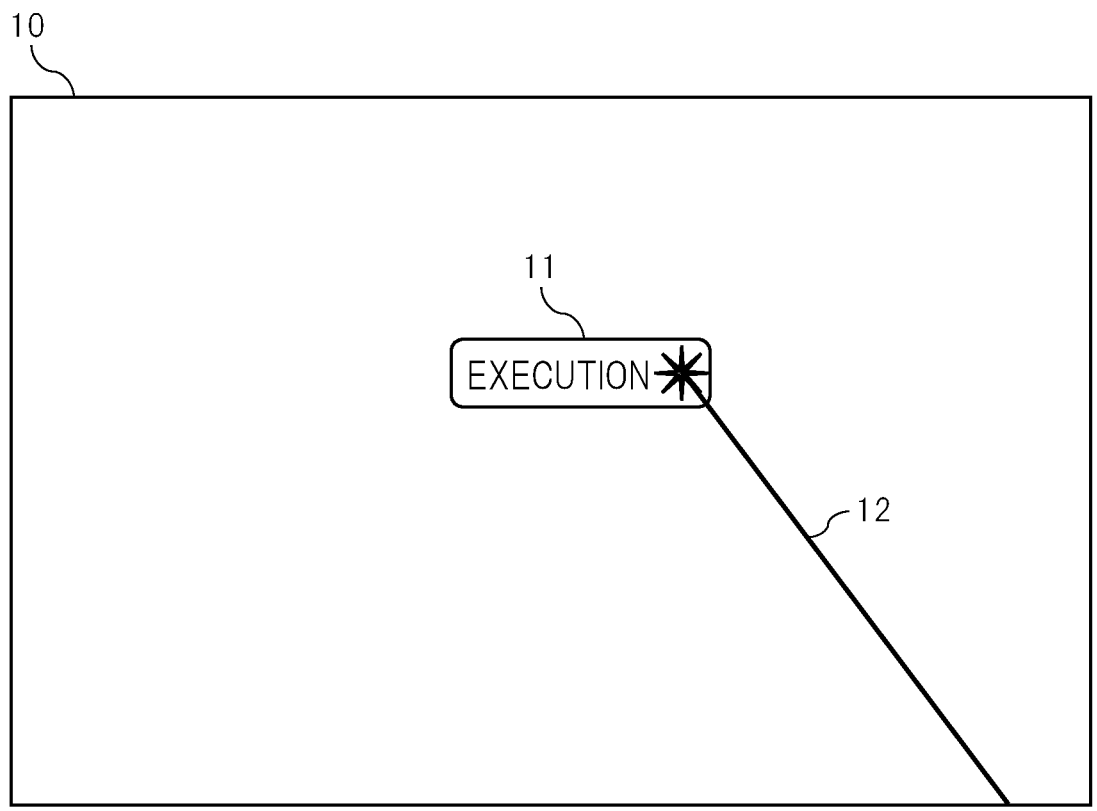
FIG. 3 is a view showing an example of an image displayed on a display of a main body device in FIG. 1.

FIG. 3 is a view showing an example of an image displayed on a display of the main body device in FIG. 1. An execution button 11 which is one of objects, and a pointing beam 12 are included in the image 10 of FIG. 3. When the user wants to select the execution button (object) 11, the user adjusts a pointing position of the pointing beam 12 to the execution button 11 by using the controller 3, and performs a predetermined operation in that state.

Comparative Example (Outline of Controller)

Figure 24:
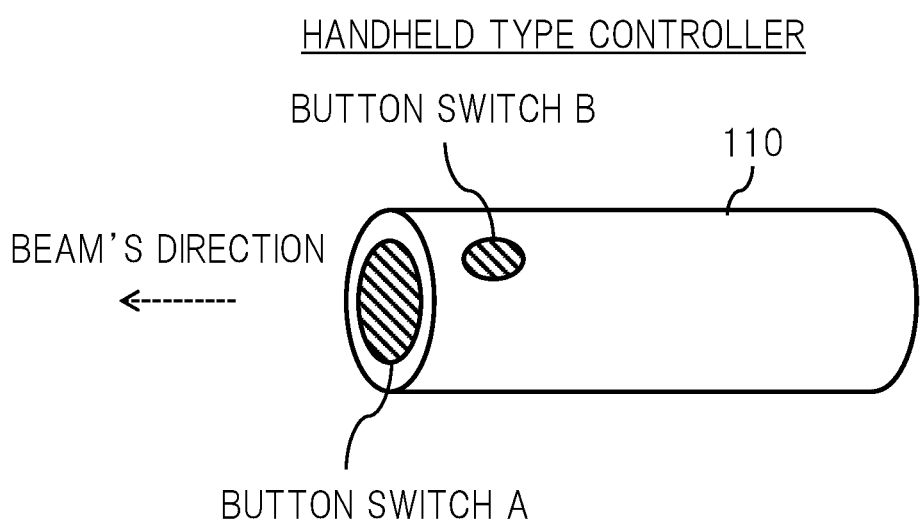
FIG. 24 is a schematic view showing an outline example of a controller in a head-mounted information processing apparatus which becomes a comparative example of the present invention.

FIG. 24 is a schematic view showing an outline example of a controller in a head-mounted information processing apparatus as a comparative example of the present invention. A controller 110 shown in FIG. 24 is used in a state of being held by a user' hand. The controller 110 includes, for example, two button switches (A and B). The user operates the pointing position of the pointing beam 12 shown in FIG. 3 by operating a direction of the controller 110, and presses the button switch (for example, A) with the pointing position adjusted to the execution button 11, thereby selecting the execution button 11.

However, in this case, the user's hand may be blocked by the controller 110, thereby making it difficult to use the hand freely. In addition, it may take time and effort to: switch the hand holding the controller 110 according to the time of needing/not needing the controller 110; search for the controller 110 at the time of needing it; or the like. Further, when it is desired to issue some commands (trigger instructions) to the main body device 2, the number of commands to be issued is limited by the number of button switches (two in this example). In an example of an application as shown in FIG. 3, one button switch is sufficient for the example, but further more button switches may be required depending on the application. From the above, the user's convenience may deteriorate.

Outline of Controller (First Embodiment)

Figure 4:
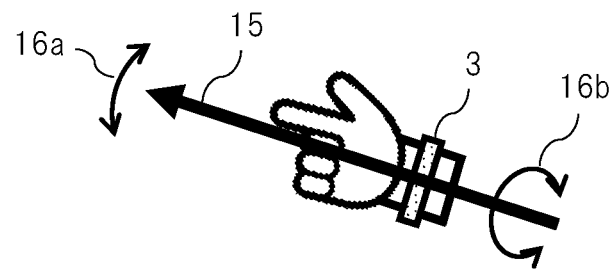
FIG. 4 is a diagram for explaining an example of an operating method of the controller by a user in FIG. 1.

FIG. 4 is a diagram for explaining an example of an operating method of a controller by a user in FIG. 1. As shown in FIG. 4, the user uses the controller 3 in a state of being worn on a user's wrist (for example, in a wound state). When the user operates the pointing position of the pointing beam 12 in FIG. 3, the user changes a direction 15 of the controller by changing an arm's direction as shown by a directional operation 16a of FIG. 4. Further, when the user selects an object (execution button) 11 pointed to by the pointing position in FIG. 3, the user rotates the controller 3 by rotation of the wrist as shown by a rotational operation 16b of FIG. 4. Here, the direction 15 of the controller coincides with a direction of a rotational axis in rotating the controller 3. In other words, the direction 15 of the controller 3 becomes an axial direction of a wristband shape which the controller 3 has.

The controller 3 detects, by the position/attitude sensor 5, the direction 15 of the controller 3 accompanying the directional operation 16a and the rotation of the controller 3 accompanying the rotational operation 16b. The position/attitude sensor 5 includes a 3-axis angular velocity sensor (gyro sensor). It's details will be described later, and the HMD 1 appropriately converts a detected result(s) of the position/attitude sensor 5 into a movement instruction of the pointing position of the pointing beam 12 or a trigger instruction (command).

In controlling the pointing position of the pointing beam 12, an angle change amount of the direction 15 of the controller 3 and an angle change amount of the direction of the pointing beam 12 may not necessarily be one-to-one. For example, when it is desired to suppress the movement of the arm by the user, the HMD 1 may control an angle change amount of the pointing beam 12 so as to become larger than the angle change amount of the direction 15 of the controller 3 based on an initial setting or the like. Meanwhile, when the user wants to finely control the pointing position of the pointing beam 12, the HMD 1 may control the angle change amount of the pointing beam 12 so as to become smaller than the angle change amount of the direction 15 of the controller 3 based on the initial setting or the like.

In controlling the trigger instruction (command), for example, when the user temporarily rotates the wrist in a left direction from a normal position, the HMD1 detects the rotational operation 16b by using the position/attitude sensor 5, and determines generation of a left-rotation command at one time. This is equivalent to, for example, pressing the button switch A in the controller 110 of FIG. 24. Similarly, the HMD1 determines generation of a right-rotation command at one time in response to temporary right rotation of the wrist. This is equivalent to, for example, pressing the button switch B in the controller 110 of FIG. 24.

When such a controller 3 is used, unlike a case of FIG. 24, the user's hand is not blocked by the controller 3, so that the user can use the hand freely. Further, since the user does not feel any discomfort even with the controller 3 worn on the wrist regardless of the time of needing/not needing it, it does not take time and effort to switch the hand handling the controller 3 or search for it. Furthermore, converting the user's movement into a command (trigger instruction) makes it possible to appropriately increase the number of commands without providing the button switch as shown in FIG. 24.

Incidentally, as shown in FIGS. 2(a) and 2(b) in the embodiment, assumed is an application to the controller 3 used in a state of being wrapped around the wrist (or hand (described later in FIG. 21)). However, in some cases, it can be applied to the controller 110 as shown in FIG. 24. In this case, although the hands are blocked, a command(s) can be issued not only by the button switch but also by the rotational operation or the like, so that the number of usable commands can be increased.

<<Configuration of HMD>>

Figure 5:
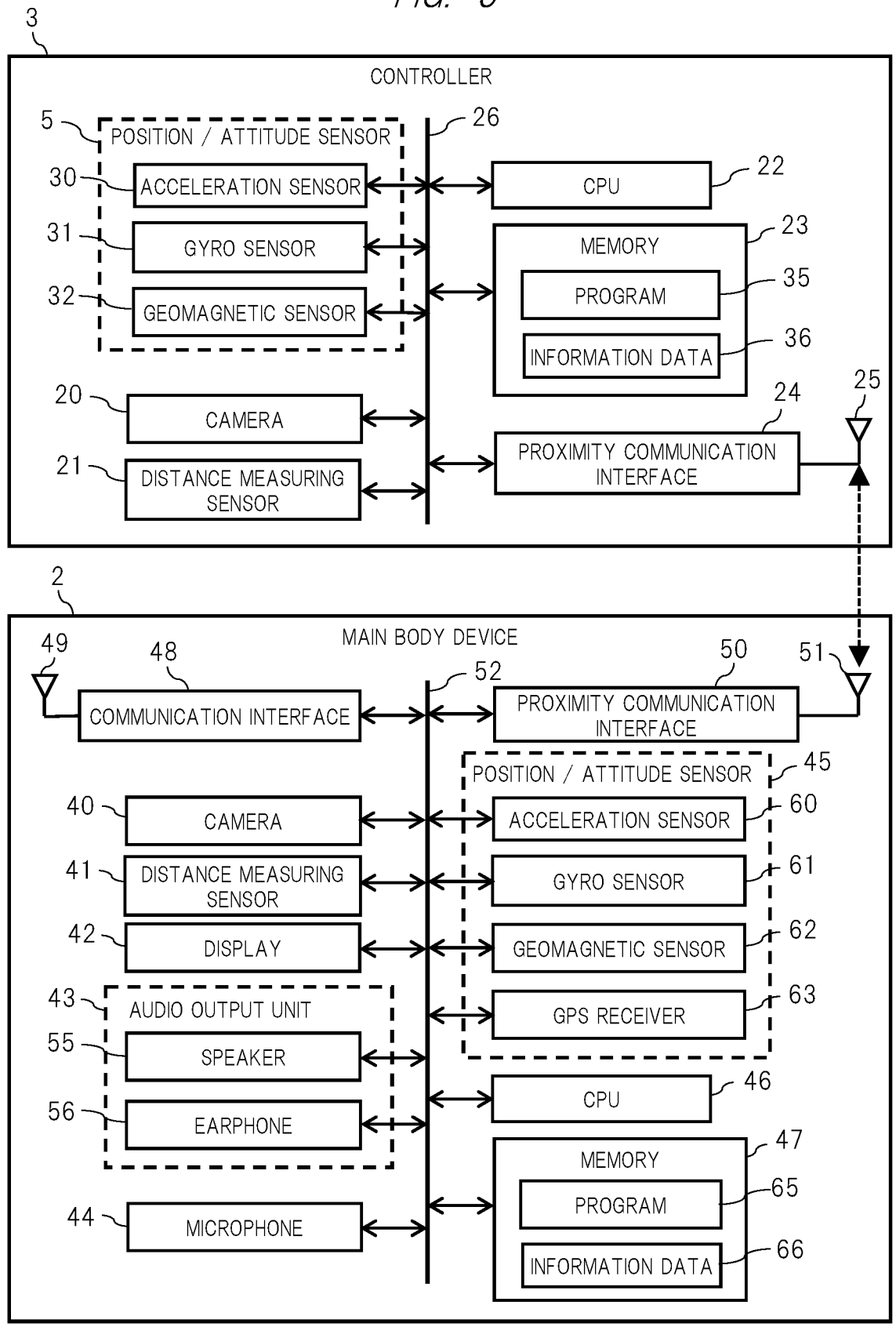
FIG. 5 is a circuit block diagram showing a schematic configuration example of the head-mount information processing apparatus in FIG. 1.

FIG. 5 is a circuit block diagram showing a schematic configuration example of the head-mounted information processing apparatus of FIG. 1. In FIG. 5, for example, the controller 3 includes a position/attitude sensor 5, a camera 20, a distance measuring sensor 21, a CPU (Central Processing Unit) 22, a memory 23, a proximity communication interface 24, a bus 26 to be mutually connected to them, and an antenna 25 connected to the proximity communication interface 24. The position/attitude sensor 5 includes an acceleration sensor (3-axis acceleration sensor) 30, a gyro sensor (3-axis angular velocity sensor) 31, and a geomagnetic sensor 32, and detects a position/attitude of the controller 3.

The acceleration sensor 30 detects movements of the controller 3 in three-axes (X-axis, Y-axis, and Z-axis) directions by detecting acceleration of the controller 3. The gyro sensor 31 detects movements of the controller 3 in rotational directions around the three axes (X-axis, Y-axis, and Z-axis) by detecting angular velocity of the controller 3. The geomagnetic sensor 32 detects an azimuth direction of the controller 3 by detecting a magnetic force of the earth. A detected result of the geomagnetic sensor 32 can be used, for example, for correcting etc. directional detection of the controller 3. The acceleration sensor 30 and the gyro sensor 31 may be each called a 6-axis sensor, an inertial sensor, or the like.

The camera 20 images an image(s) outside the controller 3, which includes the user's hand. This image makes also it possible to correct the directional detection of the controller 3. The distance measuring sensor 21 measures a distance to an object by using, for example, reflection of infrared rays, a laser, or the like. The proximity communication interface 24 performs short-range wireless communication with the main body device 2 via the antenna 25. As a short-range wireless communication method, for example, included are an electronic tag, Bluetooth (registered trademark), IrDA (Infrared Data Association), Zigbee (registered trademark), HomeRF (Home Radio Frequency, registered trademark), and the like.

The memory 23 is, for example, a flash memory, a RAM for work, or the like, and stores a program 35 and various pieces of information data 36. The program 35 includes an OS (Operating System), and various control programs that operate on the OS and control each part in the controller 3. The information data 36 includes various parameters and the like used in the program 35. The CPU 22 controls each part in the controller 3 by executing the program 35 stored in the memory. As one of them, the CPU 22 processes a detected result(s) of the position/attitude sensor 5, and transmits a processed result to the main body device 2 via the proximity communication interface 24. Incidentally, the CPU 22 may include a processor dedicated to various arithmetic processings such as a DSP (Digital Signal Processor) and a GPU (Graphics Processing Unit).

The main body device 2 includes a camera 40, a distance measuring sensor 41, a display 42, an audio output unit 43, a microphone 44, a position/attitude sensor 45, a CPU 46, a memory 47, a communication interface 48, and a proximity communication interface 50, and a bus 52 mutually connected to them. Further, the main body device 2 includes an antenna 49 connected to the communication interface 48, and an antenna 51 connected to the proximity communication interface 50.

The position/attitude sensor 45 includes an acceleration sensor (3-axis acceleration sensor) 60, a gyro sensor (3-axis angular velocity sensor) 61, and a geomagnetic sensor 62 similarly to a case of the controller 3 and has, in addition, a GPS (Global Positioning System) receiver 63, thereby detecting a position/attitude of the main body device 2. The camera 40 images (captures) an image (for example, a landscape or the like in front of the user) outside the main body device 2. Similarly to a case of the controller 3, this image also makes it possible to correct the directional detection of the position/attitude sensor 45 in the main body device 2.

The distance measuring sensor 41 measures a distance to an object by using, for example, reflection of infrared rays, a laser, or the like. The proximity communication interface 50 performs short-range wireless communication with the controller 3 via the antenna 51 similarly to the case of the controller 3. Further, the communication interface 48 wirelessly communicates with an outside (for example, an external server device or the like) other than the controller 3 via the antenna 49. Typical examples of a wireless communication method include wireless LAN (IEEE802.11a, IEEE802.11b, IEEE802.11g) and the like.

The display 42 is, for example, a liquid crystal panel or the like, and displays a predetermined image so as to be represented by an AR or VR image or the like. At this time, the display 42 can also display, as an AR image, an image captured by the camera 40. The audio output unit 43 includes, for example, a speaker 55 that converts an audio signal inside an apparatus into audio to emit sound to an outside of the apparatus, an earphone 56 that emits sound while being worn on a user's ear(s), or the like. For example, the microphone 44 collects ambient sounds generated outside the apparatus to convert them into voice signals, or collects voices uttered by the user to convert them into voice signals.

The memory 47 stores the program 65 and various pieces of information data 66 similarly to the case of the controller 3. The program 65 includes an OS, various control programs that operate on the OS and control each part in the main body device 2, and the like. The information data 66 includes various parameters and the like used in the program 65. The CPU 46 controls each part in the main body device 2 by executing the program 65 stored in the memory 47. As one of them, the CPU 46 receives the processed result of the position/attitude sensor 5 by the controller 3 through the proximity communication interface 50, and controls an image (s) of the display 42 according to received contents. Incidentally, the CPU 46 may include a processor dedicated to various arithmetic processings such as a DSP or a GPU.

<<Details of Main Part Around CPU>>

Figure 6A:
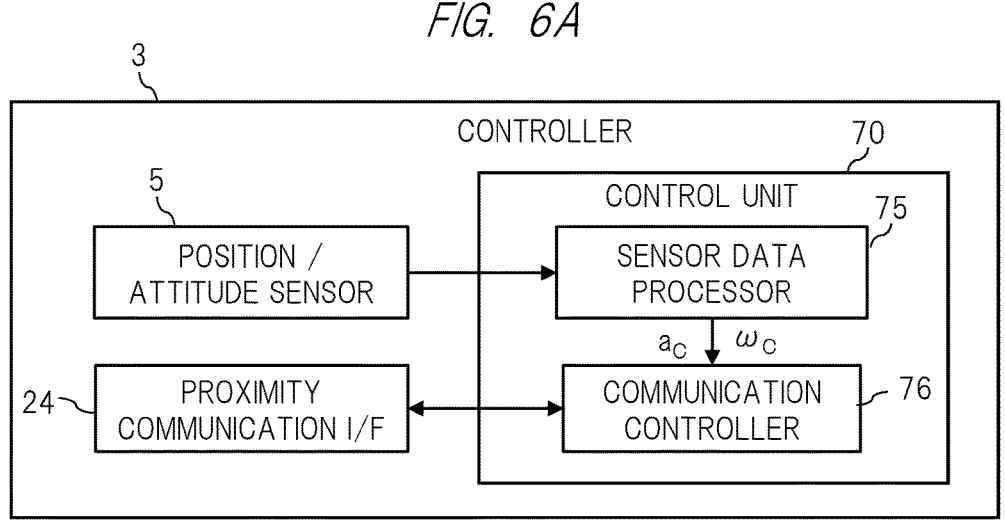
FIG. 6A is a block diagram showing a configuration example of a main part around a CPU in the controller of FIG. 5.
Figure 6B:
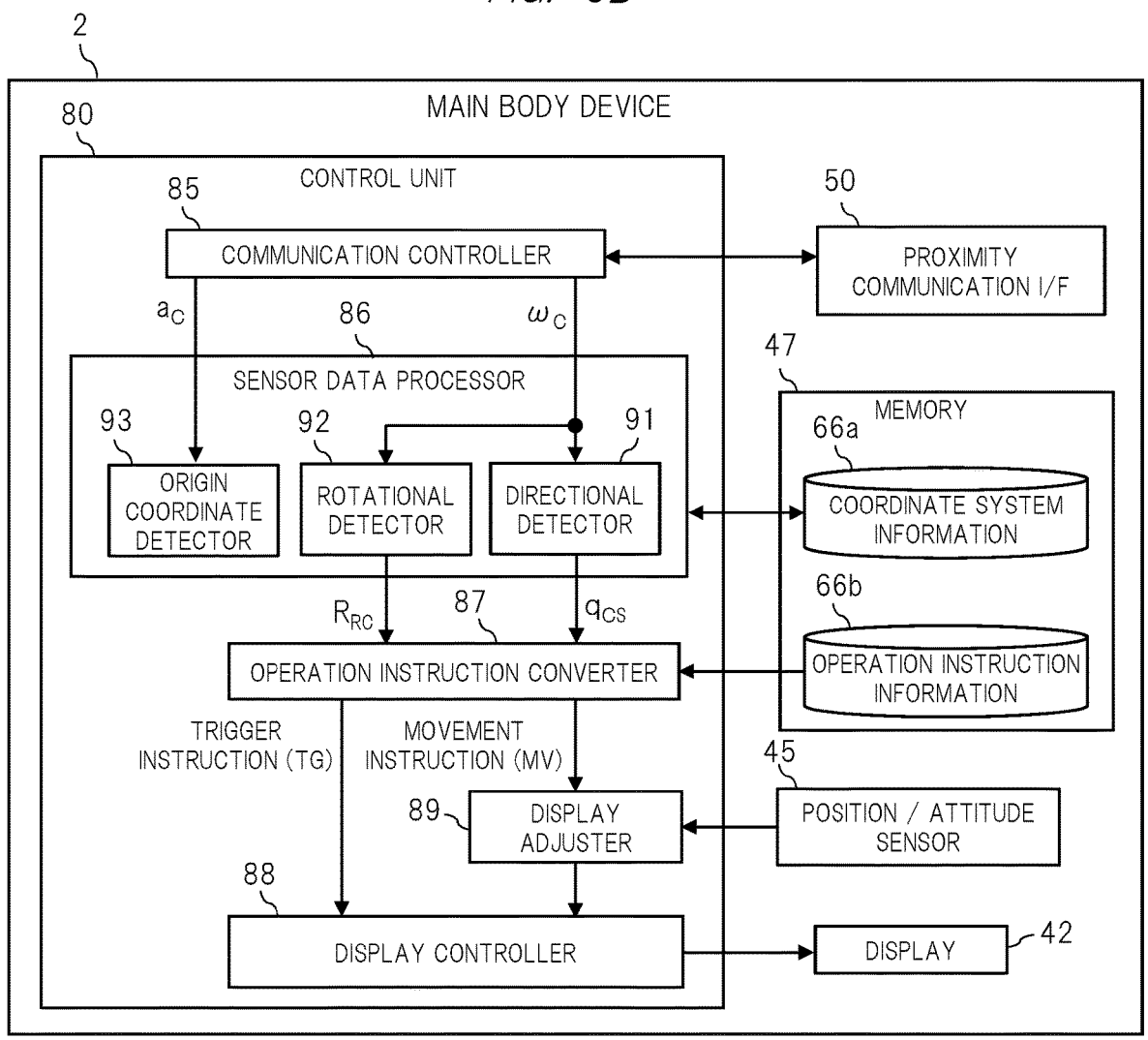
FIG. 6B is a block diagram showing a configuration example of a main part around a CPU in a main body device of FIG. 5.

FIG. 6A is a block diagram showing a configuration example of a main part around the CPU in the controller of FIG. 5, and FIG. 6B is a block diagram showing a configuration example of a main part around the CPU in the main body device of FIG. 5. In FIG. 6A, a control unit 70 includes a sensor data processor 75 and a communication controller 76. Each of these parts is mounted on the CPU 22 by, for example, the CPU 22 of FIG. 5 executing the program 35 that is stored in the memory 23.

The sensor data processor 75 periodically acquires an angular velocity vector $\omega_c$ and an acceleration vector $a_c$ that are the detected results of the position/attitude sensor 5. The angular velocity vector $\omega_c$ is obtained by the gyro sensor 31, and the acceleration vector $a_c$ is obtained by the acceleration sensor 30. The communication controller 76 periodically transmits the angular velocity vector $\omega_c$ and the acceleration vector $a_c$ acquired by the sensor data processor 75 to the main body device 2 via the proximity communication interface (abbreviated as I/F) 24.

In FIG. 6B, the control unit 80 includes a communication controller 85, a sensor data processor 86, an operation instruction converter 87, a display adjuster 89, and a display controller 88. Each of these parts is mounted on the CPU 46 by, for example, the CPU 46 of FIG. 5 executing the program 65 that is stored in the memory 47. The communication controller 85 acquires an angular velocity vector $\omega_c$ and an acceleration vector $a_c$ from the controller 3 via a proximity communication I/F 50.

The sensor data processor 86 includes a directional detector 91, a rotational detector 92, and an origin coordinate detector 93. The directional detector 91 detects a direction (in other words, the directional operation 16a in FIG. 4) of the controller 3 by calculation based on the detected result of the position/attitude sensor 5 in the controller 3. The rotational detector 92 detects rotation (in other words, the rotational operation 16b in FIG. 4) of the controller 5, which serves as a rotational axis of a direction (reference numeral 15 in FIG. 4) of the controller 5, by calculation based on the detected result of the position/attitude sensor 5 in the controller 3. Specifically, the directional detector 91 and the rotational detector 92 detect the direction and rotation of the controller 3 based on the angular velocity vector $\omega_c$ from the communication controller 85, respectively.

The origin coordinate detector 93 detects the origin coordinates in a coordinate system of the controller 5 based on the detected result of the position/attitude sensor 5 in the controller 3. Specifically, the origin coordinate detector 93 detects the origin coordinates based on the acceleration vector $a_c$ from the communication controller 85, and eventually detects translation of the controller 5. In some cases, the pointing position of the pointing beam 12 in FIG. 3 can be also translated according to the translation of the controller 5. Incidentally, the sensor data processor 86 appropriately stores coordinate system information 66a, which is the information data 66, in the memory 47 in performing such various calculational processings.

The operation instruction convertor 87 converts a detected result of the directional detector 91 and a detected result of the rotational detector 92 into instructions for the main body device 2. Here, as described above, when the user changes the direction of the controller 3 by changing the arm's direction in moving the pointing position of the pointing beam 12 and selects the object pointed to by the pointing position (that is, in issuing a trigger instruction), the user rotate the controller 3 by the rotation of the wrist. Although their details will be described later, the directional detector 91 outputs rotation $q_{CS}$, which is a normalized quaternion, as a detected result in the direction of the controller 3, and the rotational detector 92 outputs a rotational angle $R_{RC}$ as a detected result of the rotation around the axis of the controller 3.

The operation instruction convertor 87 converts the direction (rotation $q_{CS}$) of the controller 3, which is detected by the directional detector 91, into a movement instruction MV of the pointing beam 12, and convert the rotation (rotation angle $R_{RC}$) of the controller, which is detected by the rotational detector 92, into a trigger instruction TG. At this time, in the memory 66b, for example, a correspondence between the various trigger instructions such as a right-rotation command and a left-rotation command and the rotational angle $R_{RC}$ is stored in advance as operation instruction information 66b which is the information data 66. The operation instruction convertor 87 converts the rotation (rotational angle $R_{RC}$) of the controller into the trigger instruction TG based on the above-mentioned operation instruction information 66b.

The display adjuster 89 adjusts the pointing position of the pointing beam represented by the movement instruction MV so as to reflect the detected result of the position/attitude sensor 45 in the main body device 2. As a specific example, it is assumed that the pointing position of the pointing beam 12 is fixed at a center of a screen with all the user's head and arms facing forward. In this state, if the user turns only the head in a right direction by an angle θ, the arm is not moved, so that the user becomes a posture, in which the arm with respect to the head remains shifted in a left direction by the angle θ, and the pointing position still leads to being present at the center of the screen.

However, in such a case, the user often prefers sensing that the pointing position is a position which has been displaced in the left direction by the angle θ from the center of the screen. In this case, when the user turns the arm in the right direction by the angle θ so as to match with the directions of the head and the arm again, the pointing position leads to returning to the center of the screen. The display adjuster 89 reflects such a user's sense (feeling) and performs a processing of changing the pointing position by changing the contents of the movement instruction MV. Specifically, when the display adjuster 89 detects, for example, that the user's head has rotated by the angle θ in the right direction by using the position/attitude sensor 45, it changes the movement instruction MV so that the pointing position rotates by the angle θ in the left direction.

As shown in FIG. 3, the display controller 88 displays the pointing position of the pointing beam 12 onto the display 42, controls the pointing position according to the movement instruction MV from the display adjuster 89, and selects the object 11 pointed to by the pointing position according to the trigger instruction. Incidentally, here, the directional detector 91, the rotational detector 92, and the origin coordinate detector 93 are provided in the control unit 80 of the main body device 2, but in some cases, they may be provided in the control unit 70 of the controller 3. In addition, the operation instruction convertor 87 may also be provided in the control unit 70 of the controller 3 in some cases. Further, the control units 70, 80 are not limited to program processings by the CPUs 22, 46, and may be implemented by hardware such as FPGA (Field Programmable Gate Array) or by a combination of hardware and software in some cases.

<<Overall Control Flow of HMD>>

FIG. 7 is a flow diagram showing an example of a schematic controlling method in the head-mounted information processing apparatus of FIG. 5. In FIG. 7, the controller 3 performs an initialization processing (step S102) after power is turned on (step S101). The initialization processing is a processing for initializing the coordinate axes associated with a processing of sensor data, and is performed, for example, by causing the user to input an initialization command by a predetermined operating method.

Thereafter, the controller 3 performs, every predetermined detection cycle, a processing of using the sensor data processor 75 of FIG. 6A to acquire sensor data (angular velocity vector $\omega_c$ and acceleration vector $a_c$) (step S103), and a processing of using the communication controller 76 to transmit the sensor data (step S104). Then, the controller 3 repeats the processings of steps S103 and S104 until the power is turned off (step S105).

Meanwhile, the main body device 2 also performs an initialization processing after the power is turned on (step S201) (step S202). This initialization processing (step S202) is performed in conjunction with the initialization processing (step S102) of the controller 3. Then, in the initialization processing (step S202), for example, the main body device 2 uniquely associates the pointing position of the pointing beam 12 with the coordinate axes of the controller 3 at the time when the initialization command is inputted.

Thereafter, the main body device 2 sequentially receives the sensor data from the controller 3 via the communication controller 85 of FIG. 6B in response to the processing of step S104 of the controller 3 (step S203). That is, the main body device 2 sequentially receives the sensor data indicating how the position/attitude of the controller 3 has changed from the time of initialization.

Then, the main body device 2 detects the direction (change in directions) of the controller 3 by using the directional detector 91 or the like in FIG. 6B based on the received sensor data, and uses the display controller 88 to update, based on the detected result, the pointing position of the pointing beam 12 (step S204). Further, the main body device 2 uses the rotational detector 92 and the operation instruction convertor 87 of FIG. 6B to discriminate, based on the received sensor data, the detection of the trigger instruction from the user from its type and to perform a processing according to the type of the trigger instruction (Step S205). Then, the main body device 2 repeats the processings of steps S203 to S205 until the power is turned off (step S206).

<<Details of Control Unit>>
<<Usage of Symbols>>

Detailed processing contents of the control units 70, 80 shown in FIGS. 6A and 6B will be described below. Typical methods for processing the detected result of the position/attitude sensor 5 in the controller 3 include a method using Euler angles, a method using a normalized quaternion, and the like. In the first embodiment, it is assumed that a normalized quaternion is used as an example. In using the normalized quaternion, first, usage of symbols used in the specification will be described.

Rotation of a coordinate system can be represented by using a normalized quaternion. The normalized quaternion is a quaternion having a norm of 1 and represents rotation around a certain axis. The normalized quaternion that has the unit vector ($n_X$, $n_Y$, $n_Z$) as a rotational axis and represents rotation q of an angle η is given by Equation (1). In Equation (1), i, j, and k are units of quaternions. Further, the rotation q when the angle r is positive corresponds to right-hand rotation in a state of facing a direction of the unit vector ($n_X$, $n_Y$, $n_Z$). Rotation of any coordinate system is represented by this normalized quaternion.

$$q = \cos(\eta/2) + n_X \sin(\eta/2)i + n_Y \sin(\eta/2)j + n_Z \sin(\eta/2)k \quad (1)$$

The real part of the rotation q in Equation (1) is defined as Sc(q), and the vector part of the rotation q is defined as Vc (q). q* represents a conjugate quaternion to the quaternion of the rotation q. An operator that normalizes the norm of the quaternion to 1 is defined as [●]. Assuming that the rotation q is an arbitrary quaternion, Equation (2) is the definition of [●], and the denominator on the right side of Equation (2) is a norm of the quaternion of the rotation q. Further, quaternion p representing a coordinate point or a vector ($p_X$, $p_Y$, $p_Z$) is represented by Equation (3).

$$[q] = q/(qq^*)^{1/2} \quad (2)$$

$$p = p_X i + p_Y j + p_Z k \quad (3)$$

In the specification, unless otherwise specified, it is assumed that symbols representing coordinate points and vectors that are not displayed in components are displayed in quaternions and symbols representing rotation are normalized quaternions. Here, a projection operator of a vector in an n direction of the unit vector is defined as $P_S$ (n). A projection of a vector p is expressed by Equation (4). Further, assuming that a coordinate point or a directional vector $p_1$ is converted into a coordinate point or a directional vector $p_2$ by a rotational operation of the origin center represented by the rotation q, the directional vector $p_2$ is calculated by Equation (5).

$$P_S(n)p=-nSc(np) \quad (4)$$

$$p_2=qp_1q^* \quad (5)$$

Here, the rotation q for aligning directions of any two coordinate systems having the same chirality is obtained as follows. First, normalized quaternion R ($n_1$, $n_2$) that rotates the unit vector $n_1$ around an axis perpendicular to a plane including $n_1$ and $n_2$ so as to overlap with the unit vector $n_2$ is given by Equation (6).

$$R(n_1,n_2)=[1-n_2n_1] \quad (6)$$

It is considered that rotating a coordinate system "1" to align each axial direction thereof with each axis of a coordinate system "2". As symbols, representation of the coordinate system "2" with respect to the unit vectors in Y-axis and Z-axis directions of the coordinate system "1" is defined as $n_{Y12}$ and $n_{Z12}$, and representation of the coordinates system "2" itself with respect to the unit vectors in Y-axis and Z-axis directions of the coordinate system "2" is defined as $n_Y$ and $n_Z$. Rotation is obtained as an expression in the coordinate system "2".

First, it is considered that rotating the Z-axis of the coordinate system "1" to align it with the Z-axis direction of the coordinate system "2". Its rotation $q_{T1}$ is given by Equation (7) through use of Equation (6). Due to this rotation $q_{T1}$, the unit vector $n_{Y12}$ representing a Y-axis of the coordinate system "1" in the coordinate system "2" becomes the unit vector $n_{Y12m}$ of Equation (8). The unit vector $n_{Y12m}$ is orthogonal to a Z-axis of the coordinate system "2". Therefore, next, it is considered that the unit vector $n_{Y12m}$ is rotated around the Z-axis of the coordinate system "2" and is aligned with the Y-axis direction of the coordinate system "2".

Its rotation $q_{T2}$ is given by Equation (9).

$$q_{T1}=R(n_{Z12},n^Z) \quad (7)$$

$$n_{Y12m}=q_{T1}n_{Y12}q_{T1}^* \quad (8)$$

$$q_{T2}=R(n_{Y12m},n_Y) \quad (9)$$

As describe above, the expression in the coordinate system "2" of the rotation $q_T$, which rotates the coordinate system "1" and aligns each axis direction thereof with each axis direction of the coordinate system "2", is obtained by Equation (10) based on Equations (7) to (9). As a result, the unit vector represented by $n_1$ in the coordinate system "1" or the normalized quaternion representing rotation is represented by the unit vector $n_2$ of Equation (11) in the coordinate system "2". That is, when the coordinate system "1" is rotated by the rotation $q_T$, the unit vector $n_1$ of the coordinate system "1" before the rotation appears to rotate in an opposite direction of the rotation $q_T$ from the viewpoint of the coordinate system "2" after the rotation.

$$q_T=q_{T2}q_{T1} \quad (10)$$

$$n_2=q_T^*n_1q_T \quad (11)$$

<<Details of Directional detector and Origin Coordinate Detector>>

Figure 8A:
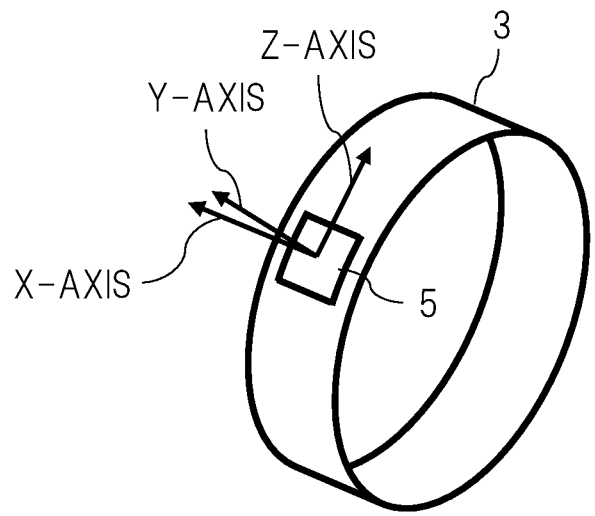
FIG. 8A is a view showing an example of a controller coordinate system associated with the controller of FIG. 6A.
Figure 8B:
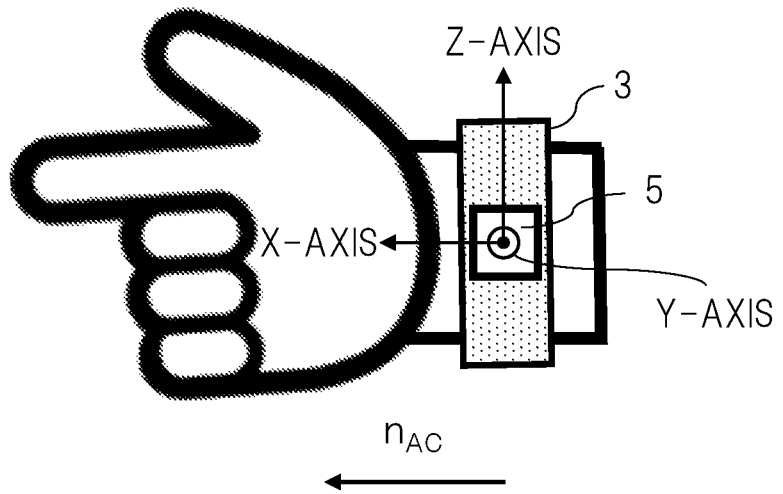
FIG. 8B is a view showing an example of a controller coordinate system associated with the controller of FIG. 6A.

First, expression of a controller coordinate system associated with the controller 3 will be described. Coordinate axes of the controller coordinate system are coordinate axes of the gyro sensor 31. FIGS. 8A and 8B are views each showing an example of a controller coordinate system associated with the controller of FIG. 6A. FIGS. 8A and 8B show, as an example, an example in which the user wears the controller 3 on the right hand and arranges the position/attitude sensor 5 (gyro sensor 31) inside the wrist.

Here, it is assumed that an axial direction of a wristband shape of the controller 3 is defined as an X-axis. Further, it is assumed that a direction perpendicular to a band surface is a Y-axis and a direction parallel to the band surface is a Z-axis, both axes being perpendicular to the X-axis. The Z-axis becomes a vertical direction when a palm surface is regarded as the vertical direction and the arm is extended in a horizontal direction. In the specification, such a coordinate system is called a right-handed coordinate system. Unless otherwise specified, the right-handed coordinate system is used in the specification.

In step S102 of FIG. 7, the user initializes the controller 3 and the like with the arm placed at a reference position. For example, it is assumed that an initialization command is movement of tilting the wrist inward three times in a row. In this case, the control unit 80 of FIG. 6B can detect the initialization command based on rotational components around the Z-axis in the angular velocity vector $\omega_C$, for example. Here, in the specification, the controller coordinate system at a time of initialization is referred to as an initial coordinate system. The initial coordinate system is a fixed coordinate system, and the controller coordinate system is a coordinate system that changes according to the movement of the controller 3. A direction of the controller coordinate system is obtained by rotating a direction of the initial coordinate system. A normalized quaternion representing this rotation is represented by $q_{CS}$. The rotation $q_{CS}$ at the time of the initialization is, for example, 1 which means no rotation.

Rotation of the controller coordinate system is detected by the gyro sensor 31. The geomagnetic sensor 32, camera 20, and distance measuring sensor 21 may be used auxetically, but they are not essential components. If it is assumed that the angular velocity vector $\omega_C$ detected by the gyro sensor 31 is ($\omega_X$, $\omega_Y$, $\omega_Z$), this angular velocity vector $\omega_C$ is expressed by a quaternion of Equation (12). The angular velocity vector $\omega_C$ in Equation (12) is a representation in the controller coordinate system. Therefore, an angular velocity vector $\omega_S$ in the initial coordinate system is given by Equation (13). That is, when the controller coordinate system is obtained by rotating the initial coordinate system with the rotation $q_{CS}$, the angular velocity vector $\omega_C$ in the controller coordinate system appears to be rotating with the rotation $q_{CS}$ from the viewpoint of the initial coordinate system.

$$\omega_C=\omega_X i+\omega_Y j+\omega_Z k \quad (12)$$

$$\omega_S=q_{CS}\omega_C q_{CS}^* \quad (13)$$

Here, when care is taken that the rotation $q_{CS}$ is a representation in the initial coordinate system, a difference equation that determines time evolution of the rotation $q_{CS}$ becomes Equation (14) which reflects a relationship of Equation (13). When $\Delta t$ is set as a detection cycle of the gyro sensor 31 in Equation (14), the rotation $q_{CS}$ is sequentially updated in response to the angular velocity vector $\omega_C$ obtained for each $\Delta t$. This makes it possible to sequentially obtain a state of how the controller 3 has rotated from the time of initialization. The directional detector 91 of FIG. 6B outputs the rotation $q_{CS}$ every $\Delta t$ by performing the calculation based on Equation (14).

$$\Delta q_{CS}/\Delta t=(\frac{1}{2})\omega_S q_{CS}=(\frac{1}{2})q_{CS}\omega_C \quad (14)$$

Incidentally, in calculating the rotation $q_{CS}$ by Equation (14), a method of increasing approximation accuracy may be used in combination, or a correction for keeping a norm of the rotation $q_{CS}$ at 1 may be added. Further, in order to correct accumulation of errors, a measured result(s) in a geomagnetic direction by the geomagnetic sensor 32 may be used, or position information of the feature points in the outside world detected by the camera 20 or the distance measuring sensor 21 may be used.

Next, a processing content(s) of the origin coordinate detector 93 will be described. For example, when translation of the controller 3, that is, movement of the origin of the controller coordinate system is also used for control, a processing by the origin coordinate detector 93 is performed. Update of the origin coordinates in the initial coordinate system of the controller coordinate system is performed based on the acceleration vector $a_C$ detected by the acceleration sensor 30. It is assumed that the acceleration vector $a_C$ is $(a_X, a_Y, a_Z)$, the acceleration vector $a_C$ is represented by a quaternion of Equation (15). Since this acceleration vector $a_C$ is a representation in the controller coordinate system, the acceleration vector as in the initial coordinate system is given by Equation (16).

$$a_C = a_X i + a_Y j + a_Z k \quad (15)$$

$$a_S = q_{CS} a_C q_{CS}^* \quad (16)$$

Here, it is assumed that the origin coordinates of the controller coordinate system in the initial coordinate system are $O_{CS}$, a velocity vector of the origin of the controller coordinate system is $v_S$, and the gravitational acceleration vector is $g_S$. The gravitational acceleration vector $g_S$ is measured at the time of initialization of the controller 3 in step S102 of FIG. 7. In using the gravitational acceleration vector $g_S$, a difference equation that determines time evolution of the velocity vector $v_S$ becomes Equation (17). Further, a difference equation that determines time evolution of the origin coordinate $O_{CS}$ becomes Equation (18).

$$\Delta v_S / \Delta t = a_S - g_S \quad (17)$$

$$\Delta O_{CS} / \Delta t = v_S \quad (18)$$

In Equations (17) and (18), if it is assumed that $\Delta t$ is set as a detection cycle of the acceleration sensor 30, the velocity vector $v_S$ is sequentially updated in response to the acceleration vector as (acceleration vector $a_C$) obtained for each $\Delta t$ and the origin coordinate $O_{CS}$ is also sequentially updated based on this vector $v_s$. The origin coordinate detector 93 of FIG. 6B updates the acceleration vector as, the velocity vector $v_s$, and the origin coordinate $O_{CS}$ every $\Delta t$ by performing the calculation based on the Equations (16), (17), and (18).

Incidentally, in calculating the velocity vector $v_s$ and the origin coordinate $O_{CS}$ with Equations (17) and (18), a method of increasing the approximation accuracy may be used in combination.

Further, the position information of the feature points in the outside world detected by the camera 20 and the distance measuring sensor 21 may be used. Furthermore, in order to simplify the processings, the detection cycle of the acceleration sensor 30 may be the same as a detection cycle of the gyro sensor 31.

<<Details of Initialization Processing>>

In performing the initialization processing of FIG. 7 (steps S102 and S202), the user first places his/her arm(s) at the reference position and inputs the initialization command of the controller 3 at this location. The initialization command may be inputted by, for example, an operation of tapping the controller 3 three times with one of the hands in addition to an operation of tilting the wrist inward three times (rotating it in a left direction in a case of the right hand) as described above. Alternatively, the initialization command is not limited to such an operation, and may be inputted by, for example, pressing etc. a hard switch installed on the main body device 2.

For example, the sensor data processor 86 of the main body device 2 recognizes, as a new initial coordinate system, the controller coordinate system at the time when the initialization command is inputted or at the time when it is determined that the initialization command is inputted by the operation. Then, the sensor data processor 86 resets the rotation $q_{CS}$ of the controller coordinate system at that time to 1 indicating no rotation. Further, the sensor data processor 86 resets the wrist's rotational angle $R_{RC}$ (described later) to 0 (zero).

Further, the sensor data processor 86 measures the gravitational acceleration vector $g_C$ (controller coordinate system) based on the acceleration vector $a_C$ received from the controller 3 with the arm stationary at the time of the initialization. As shown by Equation (19), the gravitational acceleration vector $g_S$ in the initial coordinate system is the same as the gravitational acceleration vector $g_C$ in the above-mentioned controller coordinate system. The gravitational acceleration vector $g_S$ is used, for example, in Equation (17) mentioned above.

$$g_S = g_C \quad (19)$$

<<Details of Detection of Controller Direction and Update of Beam Position>>

Details of a processing of step S204 in FIG. 7 will be described. As shown in FIG. 8B, the direction of the user's arm is defined by the unit vector $n_{AC}$ in the controller coordinate system. Then, the arm's direction at each time point (each detection cycle) is calculated by the rotation $q_{CS}$ from the time point of the initialization. If it is assumed that the unit vector in the arm's direction in the initial coordinate system is $n_{AS}$, the unit vector $n_{AS}$ can be obtained by Equation (20).

$$n_{AS} = q_{CS} n_{AC} q_{CS}^* \quad (20)$$

Figure 9:
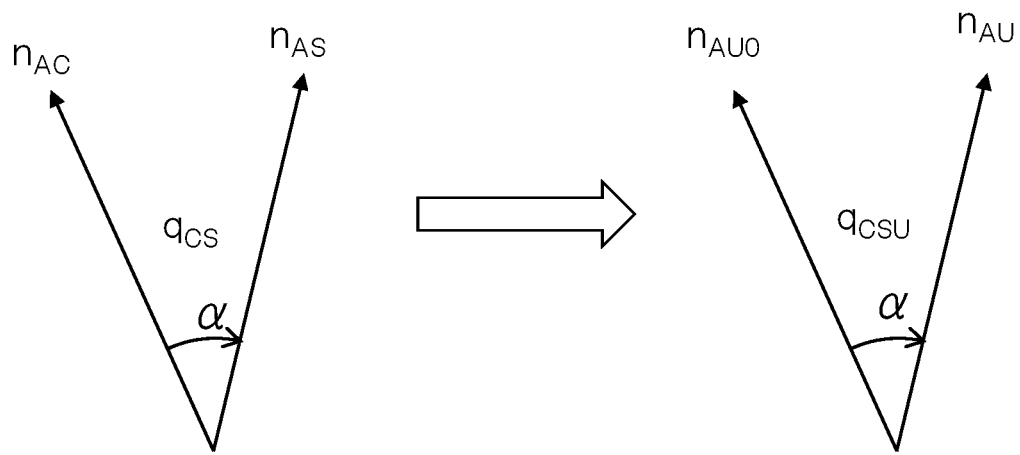
FIG. 9 is a diagram for explaining an example of a processing content associated with detection of a controller's direction and update of a beam's position in FIG. 7.

FIG. 9 is a diagram for explaining an example of processing contents associated with detection of the direction of the controller and update of the beam position in FIG. 7. When the operation instruction convertor 87 of FIG. 6B changes a direction from the unit vector $n_{AC}$ to the unit vector $n_{AS}$ by an angle change amount a due to the rotation $q_{CS}$ based on Equation (20), as shown in FIG. 9 for example, it generates a movement instruction MV so that the pointing position of the pointing beam 12 also changes its direction by the angle change amount α.

At this time, the angle change amount a of the pointing beam 12 is controlled by the coordinate system of the main body device 2, which is a space for displaying the pointing beam 12. This coordinate system of the main body device 2 is referred to as a user coordinate system in the specification. The rotation $q_{CS}$ in the initial coordinate system is represented by rotation $q_{CSU}$ in the user coordinate system. The operation instruction convertor 87 outputs the rotation $q_{CSU}$ as, for example, the movement instruction MV.

Figure 10:
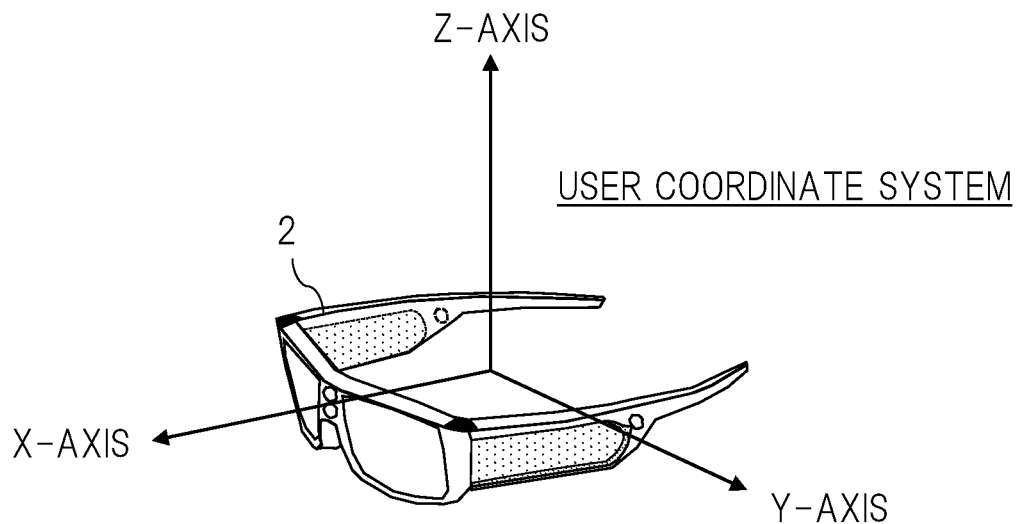
FIG. 10 is a view showing an example of a user coordinate system associated with the main body device of FIG. 6B.

FIG. 10 is a view showing an example of a user coordinate system associated with the main body device of FIG. 6B. As shown in FIG. 10, the user coordinate system is a coordinate system fixed to the main body device 2, for example, an X-axis being a front direction of the main body device 2 in a horizontal plane, a Y-axis being a user's left-hand direction in the horizontal plane, and a Z-axis being a perpendicularly upward direction. Regarding the display of the pointing beam 12, the display controller 88 of FIG. 6B sets a starting point of the pointing beam 12 in the vicinity of a position where an elbow(s) of the arm attaching the controller 3 is located, and displays the pointing beam 12 on the display 24 so as to extend from this starting point. Then, the display controller 88 controls the extending direction of the pointing beam 12 by the movement instruction MV (specifically, rotation $q_{CSU}$) from the operation instruction convertor 87. Incidentally, the display controller 88 may adjust the position of the starting point according to user's preference.

Further, a position relationship between the initial coordinate system and the user coordinate system is determined in advance by design, for example. Typically, the abovementioned position relationship is designed at such a position relationship that the pointing beam 12 extends in the horizontally front direction from the starting point while the user attaching the main body device 2 faces the front direction. In the initialization processing (steps S102, S202) of FIG. 7, the user issues an initialization command while maintaining the position relationship defined in the design.

Here, from the viewpoint of the user coordinate system, it is assumed that such rotation as to align the direction of the initial coordinate system of the controller 3 with the direction of the user coordinate system is $q_T$. The rotation $q_T$ can be determined in advance by the design, and is typically 1 representing no rotation (that is, a state where the directions of the initial coordinate system and the user coordinate system match with each other). However, if there is user's operational convenience (for example, an operation is more easily performed if the arm's direction and the direction of the pointing beam 12 are deviated by a predetermined angle), the rotation $q_T$ may be another value other than 1. By using this rotation $q_T$, the rotation $q_{CSU}$ in the user coordinate system is given by Equation (21). The operation instruction convertor 87 of FIG. 6B calculates Equation (21) and outputs the rotation $q_{CSU}$.

$$q_{CSU} = q_T * q_{CS} q_T \quad (21)$$

Further, if it is assumed that a unit vector of the pointing beam 12 in the initial state is $n_{AU0}$ and a unit vector of the pointing beam 12 after the direction has been changed is $n_{AU}$, the unit vector $n_{AU}$ can be obtained by Equation (22). The display controller 88 of FIG. 6B controls the pointing position of the pointing beam 12 based on Equation (22).

$$n_{AU} = q_{CSU} n_{AU0} q_{CSU}^* \quad (22)$$

Incidentally, as described above, the user issues the initialization command with the arm placed at the reference position, but at this time, the arm's position may deviate from an ideal reference position. By this positional deviation, an offset of an angle difference can be generated between the arm's direction and the direction of the pointing beam 12, but as long as the positional deviation is within a certain range, no problem arises on the user's sense. Meanwhile, an error(s) may occur even when the directional detector 91 calculates the rotation $q_{CS}$. This error can be expanded in time series by its accumulation, so that in that case, the user may redo the initialization.

FIG. 11 is a view showing an example of a display mode of the pointing beam displayed on a display by the display controller of FIG. 6B. On a display 42, the pointing beam 12 is displayed together with the object (execution button in FIG. 11) 11 in the space of the user coordinate system. The pointing beam 12 is displayed in a display space in a state of extending within a displayable range. First, when the pointing position of the pointing beam 12 does not hit the object 11, the object 11 is in a non-selected state (step S301).

Next, when the user operates the arm's direction and the pointing position of the pointing beam 12 hits the object 11, the object 11 is in a provisionally selected state and is changed to display indicating the provisionally selected state (step S302). In this provisionally selected state, if the user rotates, for example, the wrist (when the rotational operation 16b is performed) without changing the pointing position of the pointing beam 12, the object 11 is in a selected state and is changed to display indicating the selected state (Step S303). The display controller 88 makes such a display change, and when the object 11 is selected (in other words, the execute button is pressed) like step S303, the display controller notifies a predetermined processor of that effect, thereby causing the predetermined processor to perform a corresponding processing(s).

<<Details of Trigger Analysis (Rotational Detector and Operation Instruction Convertor)>>

Next, details of a processing of step S205 in FIG. 7 will be described. The wrist's rotation is rotation about the arm's direction used as a rotational axis. Therefore, the wrist's rotation can be detected by extracting the components of the rotational axis direction from an output of the gyro sensor 31. As shown in FIG. 8B, it is assumed that a unit vector of the arm's direction (X-axis direction in FIG. 8B) in the controller coordinate system is $n_{AC}$.

Here, to be generalized, an expression of the angular velocity vector $O_{RC}$ of the wrist's rotation in the controller coordinate system becomes Equation (23) by using the projection operator of Equation (4) and the angular velocity vector $\omega_C$ of the controller coordinate system. Rotating the wrist brings generation of components in a direction of the unit vector $n_{AC}$. The rotational detector 92 of FIG. 6B detects the wrist's rotation by extracting the components in the direction of the unit vector $n_{AC}$ from the angular velocity vector $\omega_C$ based on Equation (23).

$$\omega_{RC} = P_S(n_{AC})\omega_C \quad (23)$$

Further, when the rotation position of the wrist is expressed by the rotational angle $R_{RC}$ based on the angular velocity vector $O_{RC}$, the rotational angle $R_{RC}$ is calculated by an evolution equation of Equation (24). The rotational detector 92 calculates the rotational angle $R_{RC}$ based on Equation (24).

$$\Delta R_{RC}/\Delta t = \omega_{RC} \quad (24)$$

Figure 12A:
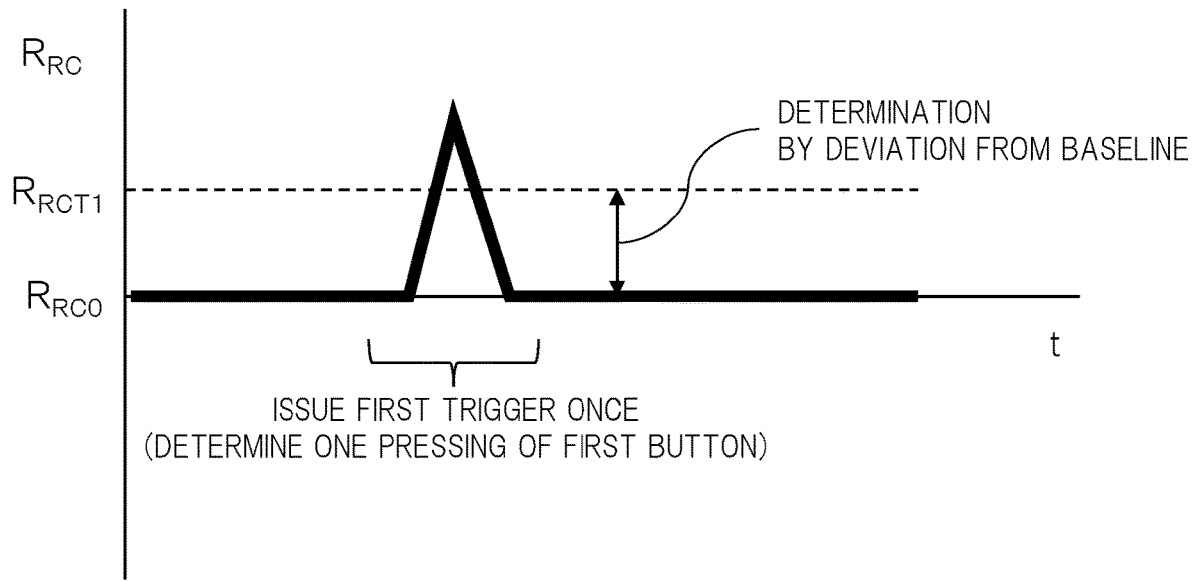
FIG. 12A is a view showing an example of a discriminating method of trigger instructions in an operation instruction converter of FIG. 6B.
Figure 12B:
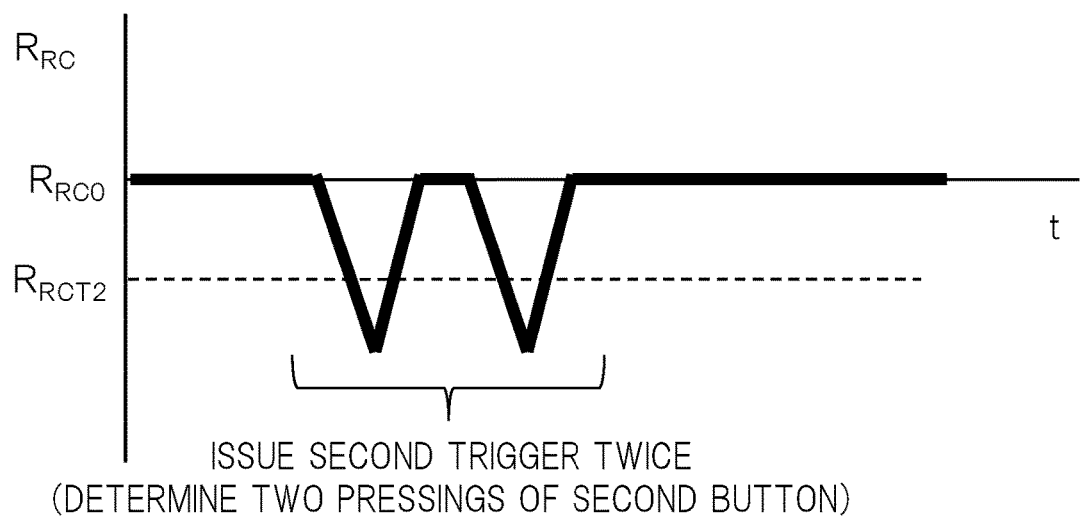
FIG. 12B is a view showing another example of a discriminating method of trigger instructions in the operation instruction converter of FIG. 6B.

Here, the rotational angle $R_{RC}$ at the time of the initialization of the controller 3 is set to 0°. The operation instruction convertor 87 of FIG. 6B determines the trigger instruction TG based on the rotational angle $R_{RC}$ from the rotational detector 92. FIGS. 12A and 12B are views each showing an example of a discriminating method of trigger instructions in the operation instruction convertor of FIG. 6B. As shown in FIGS. 12A and 12B, the operation instruction convertor 87 (specifically, operation instruction information 66b in FIG. 6B) includes rotational threshold value $R_{RCT1}$, $R_{RCT2}$ with reference to a baseline $R_{RC0}$ in advance.

The operation instruction convertor 87 issues a trigger instruction(s) when a rotational amount (rotational angle $R_{RC}$) of rotation of the controller 3 detected by the rotational detector 92 exceeds the predetermined rotational threshold values $R_{RCT1}$, $R_{RCT2}$.

In an example of FIG. 12A, the user rotates the wrist in the right direction at a rotational angle exceeding the rotational threshold value $R_{RCT1}$ and then returns it to an original position. In response to this, the operation instruction convertor 87 issues a first trigger instruction corresponding to the right rotation at one time (in other words, it is determined that a first button has been pressed at one time).

In an example of FIG. 12B, the user performs, twice in succession, operations of rotating the wrist in the left direction at a rotational angle exceeding a rotational threshold value $R_{RCT2}$ and then returning the wrist at the original position. In response to this, the operation instruction converter 87 issues twice a second trigger instruction corresponding to the left-hand rotation (in other words, it is determined that a second button is pressed twice). Here, the operation instruction converter 87 can also determine the trigger instruction finally once according to an occurrence status of a plurality of times of the trigger instructions generated within a predetermined fixed time. In the example of FIG. 12B, the operation instruction converter 87 can handle, as a so-called double-click, two issuances of the second trigger instruction that occurs within a certain period of time.

Incidentally, the baseline $R_{RC0}$ is not always 0° due to an error in angle detection, a deviation in a holding angle of the wrist, and the like. Therefore, similarly to Equation (25), the operation instruction converter 87 may take out a low-frequency component of the rotational angle $R_{RC}$ and set it as the baseline $R_{RC0}$. The right side of Equation (25) means an averaging processing of the rotational angle $R_{RC}$. An example of an averaging method, for example, an index movement average processing represented by Equation (26) is given. In Equation (26), ξ is an averaging coefficient and takes a value between 0 and 1.

$$R_{RC0} = <R_{RC}> \tag{25}$$

$$<R_{RC}(t+\Delta t)> = \xi R_{RC}(t) + (1-\xi)<R_{RC}(t)> \tag{26}$$

Here, if such a trigger instruction by the wrist's rotation is used, the directional detector 9 of FIG. 6B is affected by the wrist's rotation and the pointing position of the pointing beam 12 may deviate from a user's intention. Specifically, for example, in step S303 of FIG. 11, when the user makes the object (execution button) 11 a selected state, the pointing position of the pointing beam 12 deviates from the object 11 by the rotational operation 16b and the user may be unable to make the object the selected state.

Figure 13A:
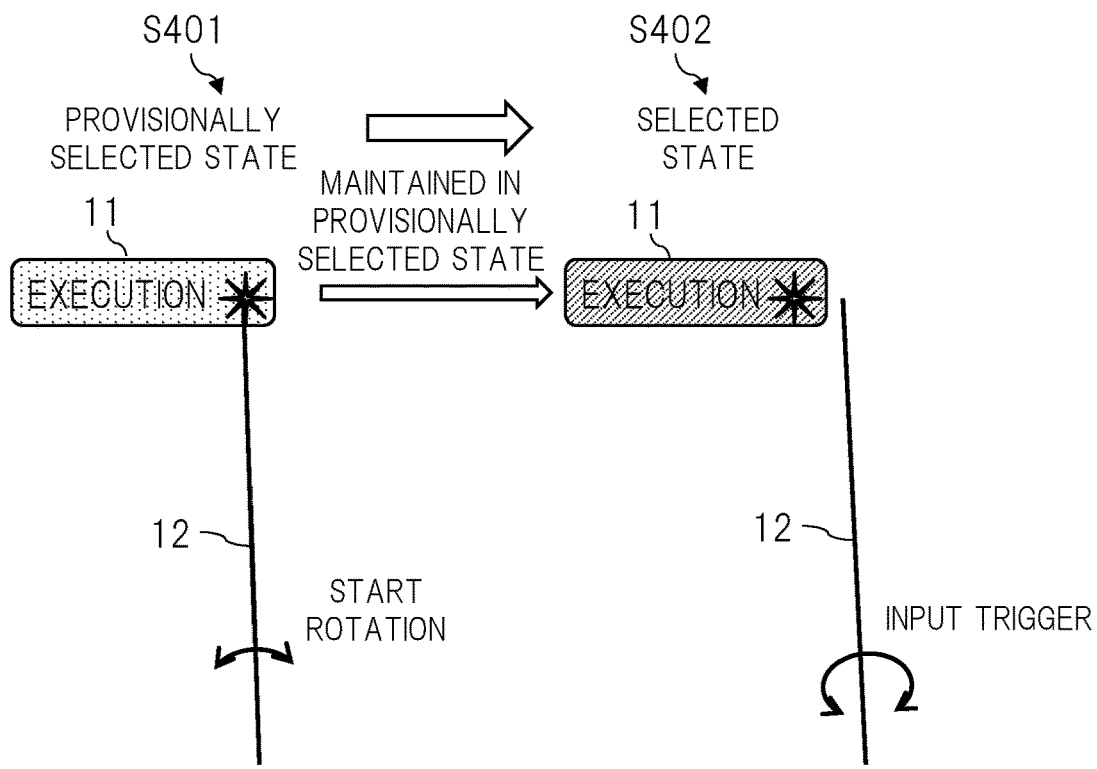
FIG. 13A is a diagram for explaining an example of a processing content associated with object selection in the operation instruction converter and the display controller of FIG. 6B.
Figure 13B:
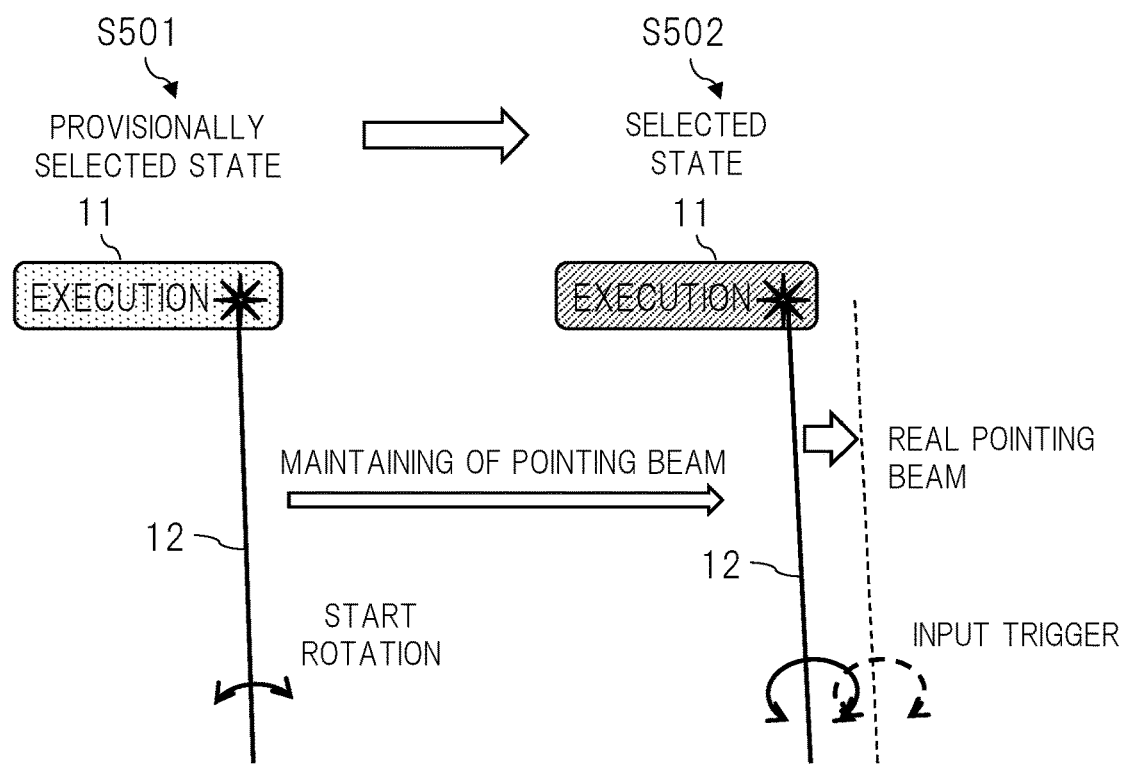
FIG. 13B is a diagram for explaining an example of another processing content associated with object selection in the operation instruction converter and the display controller of FIG. 6B.
Figure 14:
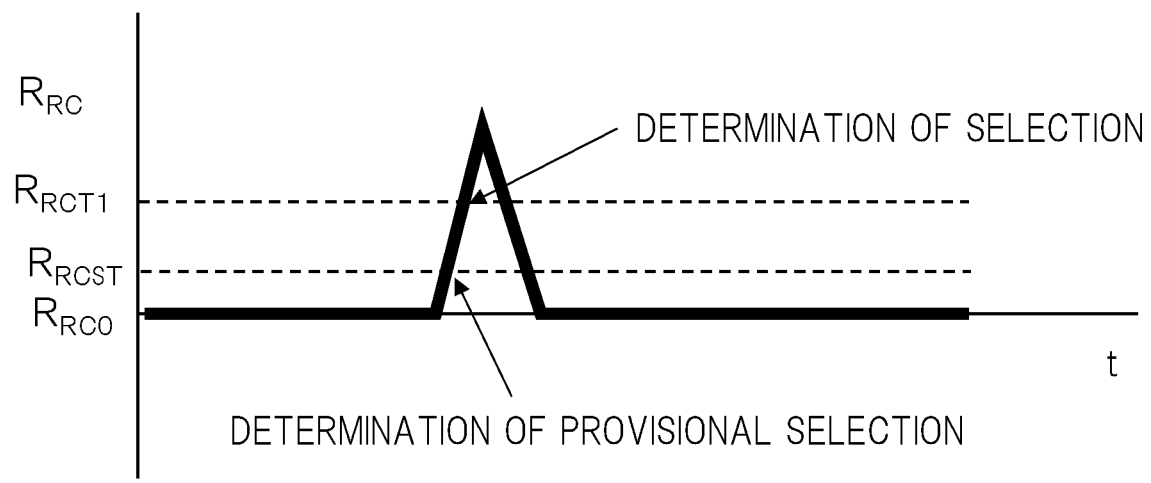
FIG. 14 is a diagram for explaining an example of a processing content associated with object selection in the operation instruction converter of FIG. 6B.

Therefore, it is beneficial to use a method(s) as shown in FIGS. 13A, 13B, and 14. Each of FIGS. 13A and 13B is a diagram for explaining an example of processing contents associated with object selection in the operation instruction converter and display controller of FIG. 6B, and FIG. 14 is a diagram for explaining an example of a processing content associated with the object selection in the operation instruction converter of FIG. 6B.

As shown in FIG. 14, the operation instruction converter 87 includes, for example, a rotation starting threshold value $R_{RCST}$ which is a value smaller than the rotational threshold value $R_{RCT1}$ in addition to the rotational threshold value $R_{RCT1}$ as described in FIG. 12A. Then, the operation instruction converter 87 issues a trigger instruction when a rotational amount (rotational angle $R_{RC}$) of the rotation of the controller 3 detected by the rotational detector 92 exceeds the rotational threshold value $R_{RCT1}$, and issues a rotation starting notification when the rotational amount exceeds the rotation starting threshold value $R_{RCST}$.

Meanwhile, as shown in FIG. 13A or FIG. 13B, the display controller 88 makes the object (execution button) 11, which is pointed to by the pointing position of the pointing beam 12, a provisionally selected state when receiving the rotation starting notification (steps S401, S501). Thereafter, when receiving the trigger instruction, the display controller 88 switches the object 11 on the provisionally selected state to a selected state regardless of whether the pointing position at the time of receiving the trigger instruction points to the object 11 on the provisionally selected state (steps S402, S502).

As a specific processing content, in an example of FIG. 13A, when putting the object 11 into the provisionally selected state (step S401), the display controller 88 maintains the provisionally selected state of the object 11 for a certain period of time regardless of whether the actual pointing position is moved in the subsequent steps. Further, in an example of FIG. 13B, when putting the object 11 into the provisionally selected state (step S501), the display controller 88 performs a processing by regarding the pointing position as being unchanged for a certain period of time regardless of whether the actual pointing position is moved in the subsequent steps.

<<Correction of Coordinate System in Initialization Processing>>

As described in step S102 of FIG. 7, the user inputs the initialization command with the arm placed at the reference position. The reference position is, for example, a position where the arm is kept horizontally. However, even if the user intends to keep the arm horizontally, the arm may actually be slightly displaced from the horizontal direction. That is, an error may occur between the horizontal direction, which the user feels that the arm is in, and the actual horizontal direction based on the gravitational acceleration. This error causes the user to feel uncomfortable when the user operates the pointing beam 12 depending on the arm's direction. Therefore, in order to match the horizontal direction with the user's sense, correction using the gravitational acceleration vector may be performed.

Specifically, it is assumed that with respect to the gravitational acceleration vector $g_S$ (Equation (19)) obtained in the initialization processing, the gravitational acceleration vector in the initial coordinate system (on design) under an ideal state is set to $g_{s0}$. Further, it is assumed that an initial value of the rotation $q_{CS}$ from the initial coordinate system to the controller coordinate system is set to $q_{CS0}$. In this case, the directional detector 91 of FIG. 6B sets the initial value $q_{CS0}$ of the rotation $q_{CS}$ to not 1 indicating no rotation but a value that has been rotated by a deviated amount of the gravitational acceleration vector. That is, the directional detector 91 sets the initial value $q_{CS0}$ to a value of Equation (27) by using the normalized quaternion R ($n_1$, $n_2$) of Equation (6). This makes it possible to reduce the discomfort of the user.

$$q_{CS0} = R(g_S, g_{s0}) \tag{27}$$

<<Modification Example of Display Form>>

Figure 15:
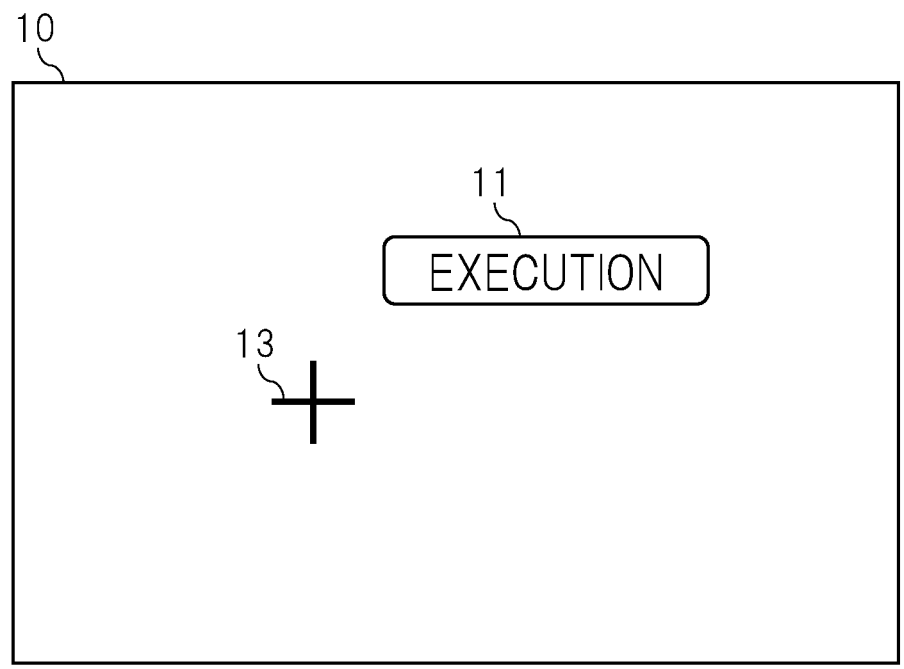
FIG. 15 is a view showing an example of an image different from that of FIG. 3 displayed on the display of the main body device in FIG. 1.

FIG. 15 is a view showing an example of an image different from that in FIG. 3, which is displayed on the display of the main body device, in FIG. 1. In FIG. 15, a cursor 13 is displayed instead of the pointing beam 12 shown in FIG. 3. In this case, the object (execution button) 11 that is superimposed with the cursor 13 becomes a selecting target when the object is seen from a user's line of sight. Similarly to a case of FIG. 3, the user controls a position (pointing position) of the cursor by the arm's direction.

The display controller 88 of FIG. 6B assumes, for example, a spherical surface centered on the user in the processing, and displays the cursor 13 at an intersection between the not-displayed pointing beam 12 and the spherical surface. Further, the display controller 88 may invalidate an input of the trigger instruction by the controller 3 when the cursor 13 does not exist in a region visibly recognizable to the user. This also applies to a case of the pointing beam 12.

Main Effects of First Embodiment

As described above, using the head-mounted information processing apparatus according to the first embodiment makes it possible to typically improve the convenience of the user.

Specifically, the user can freely use his/her hands unlike a case of using the controller 110 as shown in FIG. 24. In addition, the number of trigger instructions (commands) can be increased according to a move (s) of the user. Incidentally, as described above, the trigger instruction (command) according to the move of the user can also be applied to the controller 110 as shown in FIG. 24.

Second Embodiment

<<Modification Example of Trigger Instruction>>

Figure 16A:
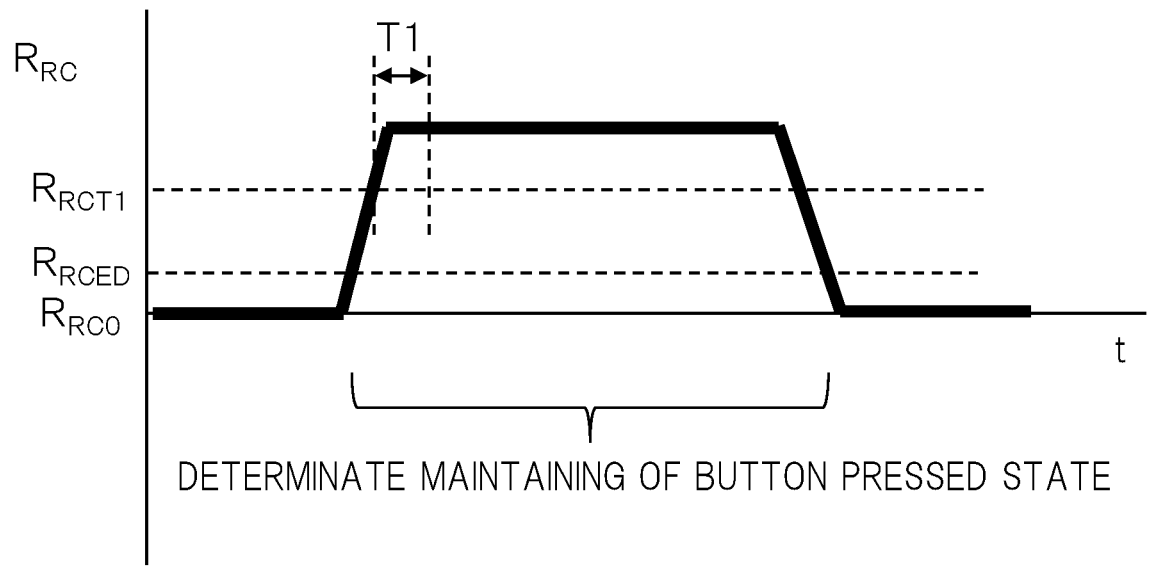
FIG. 16A is a view showing an example of a discriminating method of trigger instructions by the operation instruction converter of FIG. 6B in a head-mounted information processing apparatus according to a second embodiment of the present invention.

FIG. 16A is a view showing an example of a discriminating method of trigger instructions by the operation instruction converter of FIG. 6B in a head-mounted information processing apparatus according to a second embodiment of the present invention.

Figure 16B:
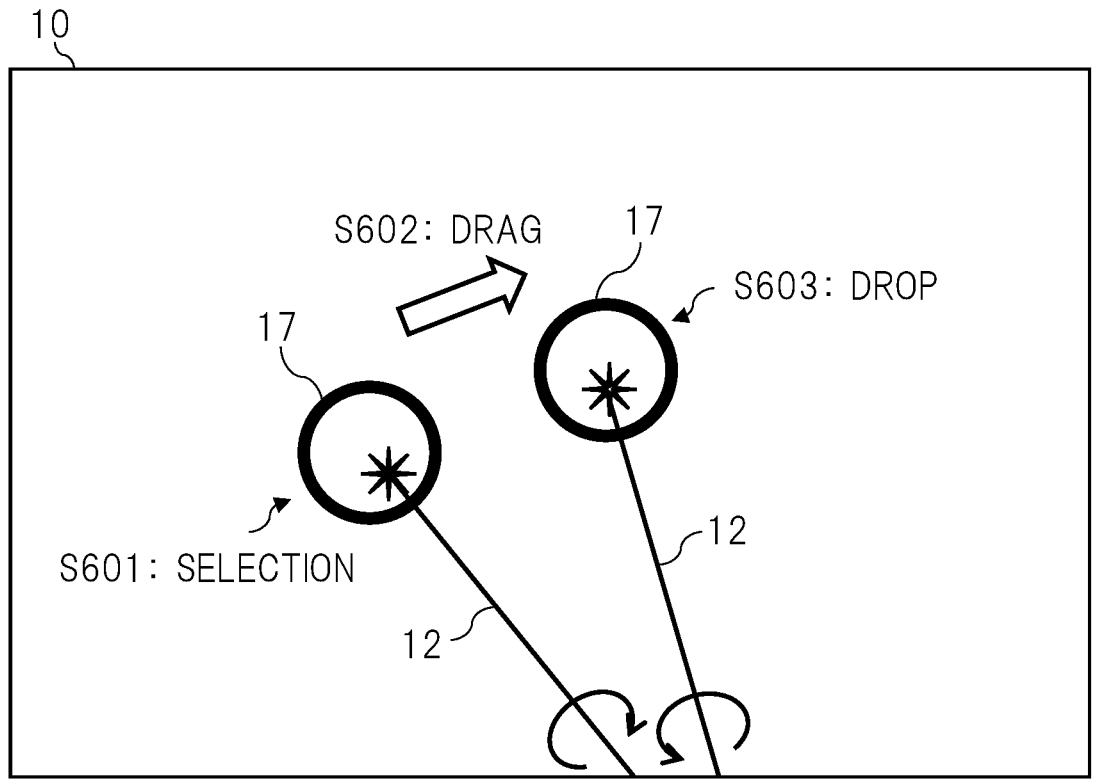
FIG. 16B is a diagram for explaining an example of a processing content of a display controller of FIG. 16B, which corresponds to that of FIG. 16A.

FIG. 16B is a diagram for explaining an example of a processing content of the display controller of FIG. 6B according to FIG. 16A. The operation instruction converter 87 of FIG. 6B issues a starting instruction of drag and drop when the rotated state of the controller 3 is maintained, and issues an ending instruction of the drag and drop when the rotated state is restored.

In an example of FIG. 16A, the operation instruction converter 87 issues the starting instruction of the drag and drop when the rotational angle $R_{RC}$ from the rotational detector 92 exceeds the rotational threshold value $R_{RCT1}$ and a state of exceeding the rotational threshold value $R_{RCT1}$ is maintained for a certain period of time T1 unlike the case of FIG. 12A. Thereafter, the operation instruction converter 87 issues the ending instruction of the drag and drop when the rotational angle $R_{RC}$ falls below a rotation ending threshold value $R_{RCED}$ provided near the baseline $R_{RC0}$ and between the baseline $R_{RC0}$ and the rotational threshold value $R_{RCT1}$.

Meanwhile, as shown in FIG. 16B, the user rotates the wrist in the right direction in a state of adjusting the pointing position of the pointing beam 12 to the predetermined object 17, and maintains such a state (step S601). Thereafter, the user changes the arm's direction while maintaining the right rotation of the wrist (step S602), and then restores the right rotation of the wrist (step S603). The operation instruction converter 87 issues the starting instruction of the drag and drop in accordance with step S601, and issues the ending instruction of the drag and drop in response to step S603. The display controller 88 of FIG. 6B responds to the movement instruction MV (that is, a change in arm's direction) issued by the operation instruction converter 87 during a period from the drag-and-drop starting instruction to the drag-and-drop ending instruction, and moves a position of the object 17 that is pointed to by the pointing position of the pointing beam 12.

Figure 17:
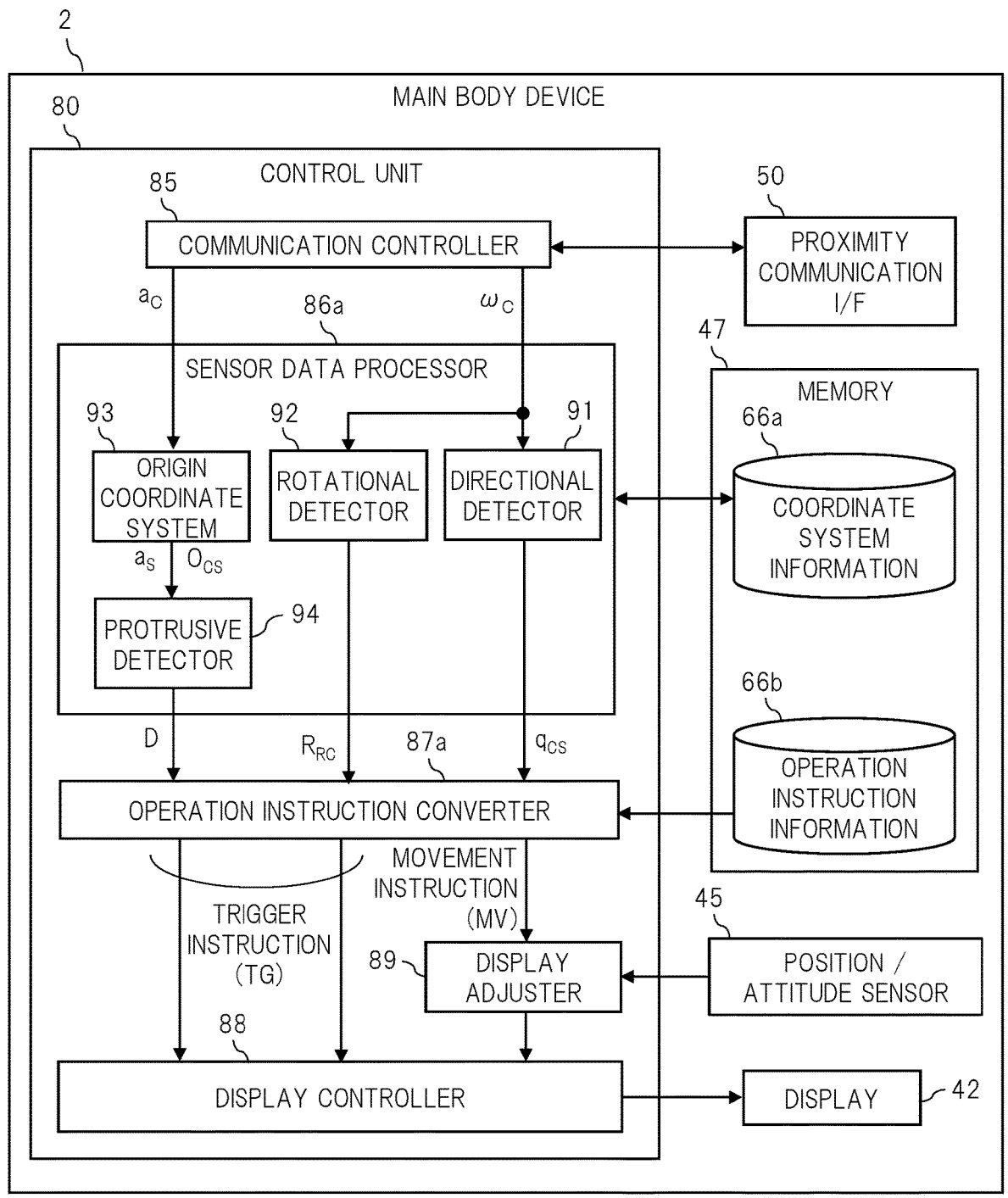
FIG. 17 is a block diagram showing a modification example of the main body device of FIG. 6B in the head-mounted information processing apparatus according to the second embodiment of the present invention.

FIG. 17 is a block diagram showing a modification example of the main body device of FIG. 6B in the head-mounted information processing apparatus according to the second embodiment of the present invention. The main body device 2 of FIG. 17 includes a protrusive detector 94 in the sensor data processor 86a in addition to the configuration example of FIG. 6B. The protrusive detector 94 detects, by calculation, the movement of the controller 3, which is directed in the arm's direction (that is, direction of rotational axis), based on a detected result(s) of the position/attitude sensor 5 of the controller 3. Moreover, in response to this, an operation instruction converter 87a of FIG. 17 converts the movement of the controller 3, which has been detected by the protrusive detector 94, into another trigger instruction TG.

Figure 18:
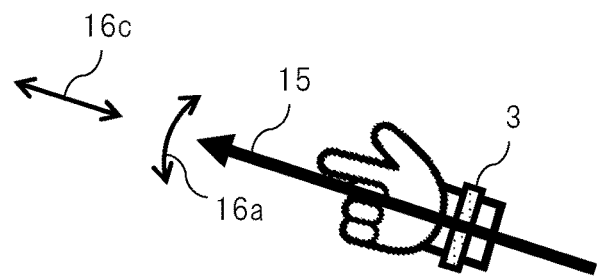
FIG. 18 is a diagram for explaining an example of an operating method of a controller by a user, which is associated with FIG. 17.

FIG. 18 is a diagram for explaining an example of an operating method of the controller by the user according to FIG. 17. As shown in FIG. 18, the user issues a trigger instruction by performing a protruding operation 16c of the arm toward the arm's direction 15 (direction of rotational axis). For example, the user issues a trigger instruction to an object to be targeted by performing the protruding operation 16c in a state of adjusting (aligned) the pointing position of the pointing beam to the object to be targeted.

Such a protruding operation 16c can be detected by using the acceleration sensor 30 in the controller 3. If the detection is specifically described, first, an origin coordinate detector 93 shown in FIG. 17 detects an acceleration vector as, a velocity vector $v_s$, and an origin coordinate $O_{CS}$ in the initial coordinate system based on the acceleration vector $a_C$ from the acceleration sensor 30 as described in FIG. 6B and Equations (16) to (18). However, this origin coordinate $O_{CS}$ may drift due to a detection error(s).

Therefore, the protrusive detector 94 in FIG. 17 recognizes a start of the protruding operation of the arm, for example, when an absolute value component of the acceleration vector as in the arm's direction exceeds a predetermined threshold value. Then, the protrusive detector 94 sets, as a starting point $O_{CS0}$, the origin coordinate $O_{CS}$ at a start time of the protruding operation, and calculates a deviation vector $O_{CSd}$ of the subsequent origin coordinate $O_{CS}$ in the arm's direction with reference to the starting point $O_{CS0}$. Specifically, the protrusive detector 94 calculates Equation (28) by using a projection operator $P_S(n)$ of Equation (4) and a unit vector $n_{AS}$ in the arm's direction in the initial coordinate system. Further, the protrusive detector 94 calculates a norm D of the deviation vector $O_{CSd}$ based on Equation (29).

$$O_{CSd}=P_S(n_{AS})(O_{CS}-O_{CS0}) \quad (28)$$

$$D=(O_{CSd}O_{CSd}^*)^{1/2}. \quad (29)$$

Figure 19:
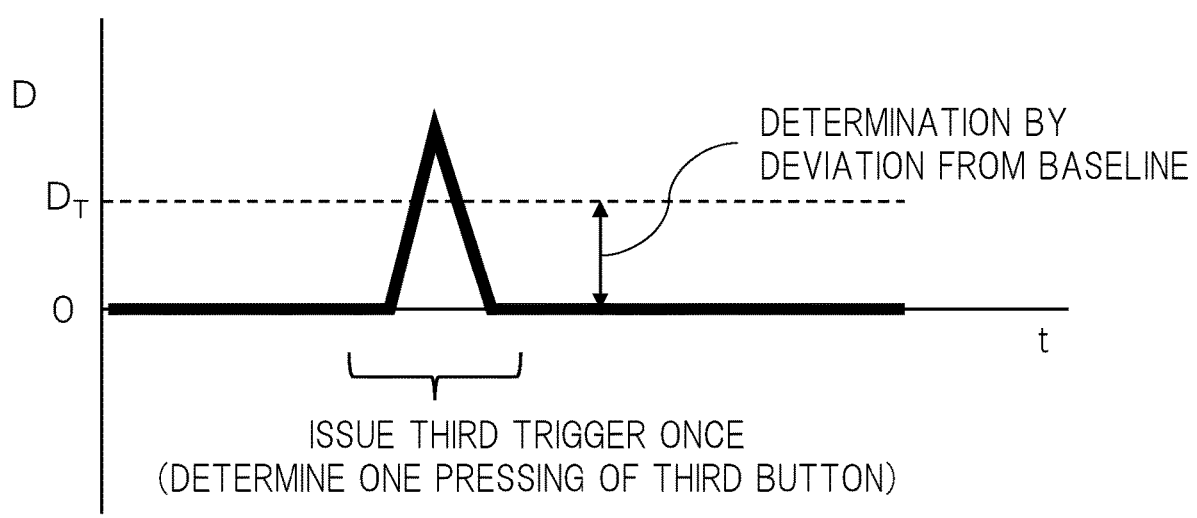
FIG. 19 is a view showing an example of a discriminating method of trigger instructions in an operation instruction converter of FIG. 17.

FIG. 19 is a view showing an example of a discriminating method of trigger instructions in the operation instruction converter of FIG. 17. As shown in FIG. 19, the operation instruction converter 87a has a protrusive threshold value $D_T$ in advance. The operation instruction converter 87a issues a trigger instruction (third trigger instruction) TG when the norm D from the protrusive detector 94 exceeds the protrusive threshold value $D_T$. The trigger instruction TG corresponds to pressing of a third button, for example, when the right rotation and the left rotation of the wrist correspond to pressing of the first and second buttons, as described in the first embodiment.

Main Effects of Second Embodiment

As described above, using the head-mounted information processing apparatus according to the second embodiment makes it possible to further increase the number of trigger instructions (commands) in addition to the various effects described in the first embodiment. Further, the protruding operation 16c in FIG. 18 and the dragging operation in FIG. 16B can also be used in combination. In this case, for example, when moving an object in a 3D display, the user can move the object in a depth direction in the 3D display by the protruding operation 16c.

Further, by utilizing this dragging operation, the HMD 1 may control a user's position in the virtual space so as to move forward (for example, at the left rotation) or backward (for example, at the right direction) in the beam's direction, for example, when the user maintains a state of rotating the wrist in the right or left direction under a state of determining the direction of the pointing beam.

Third Embodiment

<<Another Example of Controlling Method by Controller>>

Figure 20:
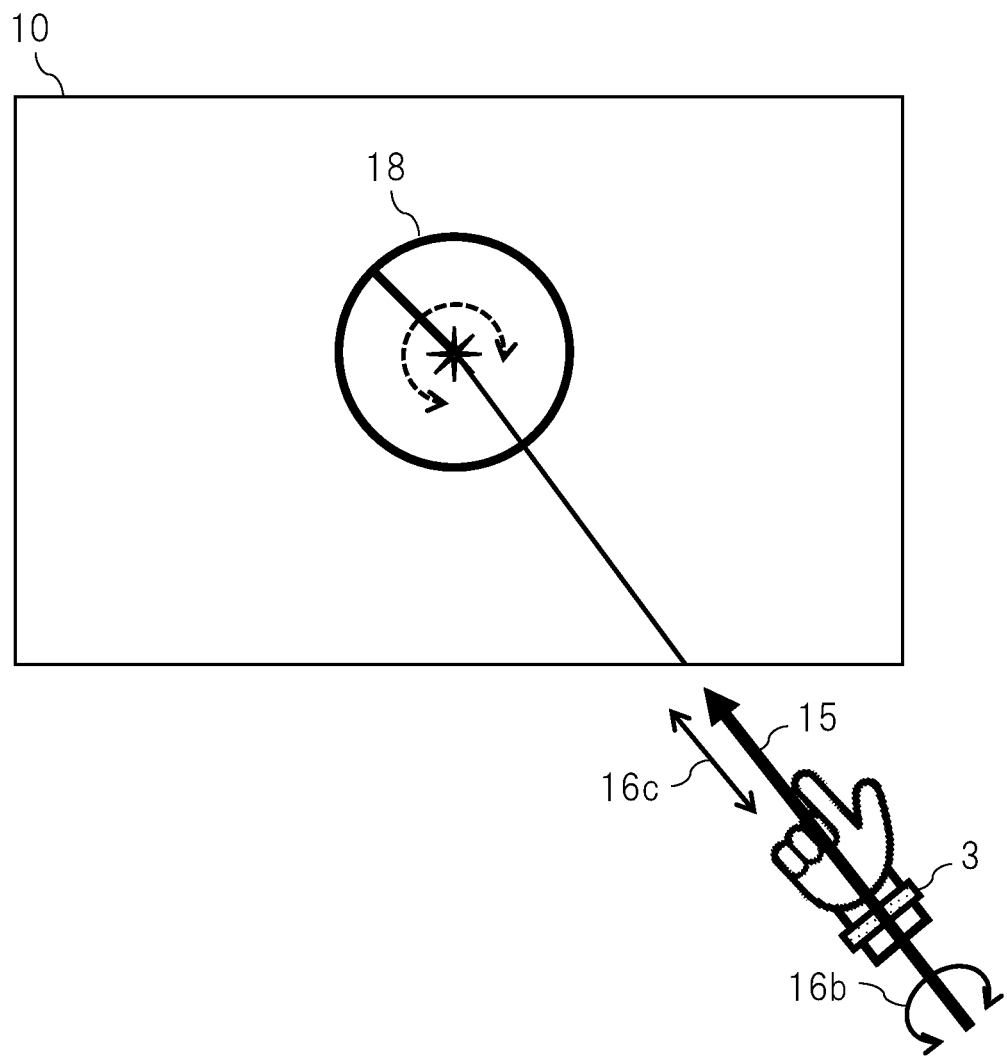
FIG. 20 is a diagram for explaining an example of another controlling method using the configuration examples of FIGS. 6A and 6B in a head-mounted information processing apparatus according to a third embodiment of the present invention.

FIG. 20 is a diagram for explaining an example of another controlling method using the configuration examples of FIGS. 6A and 6B in a head-mounted information processing apparatus according to a third embodiment of the present invention. For example, the operation instruction converter 87 of FIG. 6B converts the rotational amount (rotational angle $R_{RC}$) of the rotation of the controller 3, which is detected by the rotational detector 92, into a state controlling instruction used for continuous control in the main body device 2. As state control, for example, control etc. of a position and a speed of rotation in the virtual space are given.

In an example of FIG. 20, a dial object 18 is displayed in the image 10 of the display 42. The user operates a rotational amount of the dial according to an arm's rotational amount accompanying the rotating operation 16b. In this case, the operation instruction converter 87 outputs the rotational amount (rotational angle $R_{RC}$) to the display controller 88 as it is, and the display controller 88 sequentially updates the display of the rotational amount of the dial according to the rotational amount.

Incidentally, the user may perform the rotating operation 16b after performing the protruding operation 16c in a state of adjusting the pointing beam to the dial object 18, for example. In this case, the display controller 88 selects the object 18 in response to the trigger instruction corresponding to the protruding operation 16c from the operation instruction converter 87a of FIG. 17 and, in that state, sequentially updates the display of the rotational amount of the dial response to the rotational amount (rotational angle $R_{RC}$) from the operation instruction converter 87. Consequently, for example, prevented can be such a situation that a dial's value may be changed just by accidentally crossing the pointing beam.

Main Effects of Third Embodiment

As described above, using the head-mounted information processing apparatus according to the third embodiment makes it possible for the user to perform the continuous control (state control) to the main body device 2 by the rotating operation of the wrist in addition to the various effects described in the first embodiment and the like.

Four Embodiment

Controller's Mounting Location (Modification Example)

Figure 21:
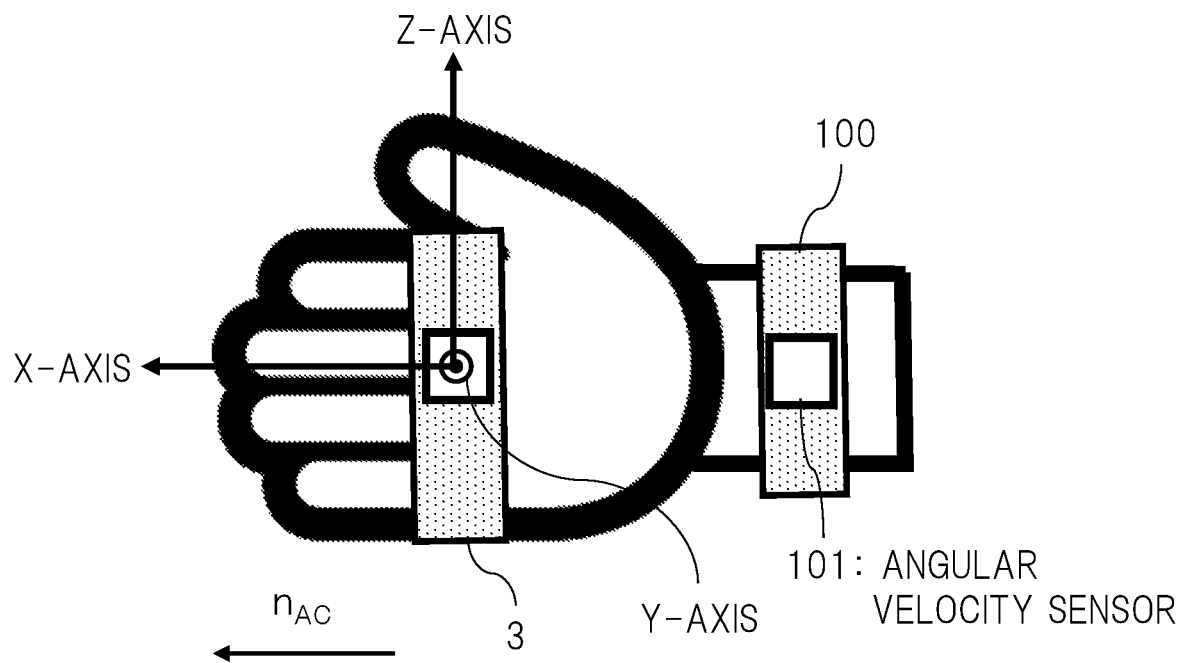
FIG. 21 is a view showing a modification example of an attachment part of a controller in a head-mounted information processing apparatus according to a fourth embodiment of the present invention.

FIG. 21 is a view showing a modification example of a mounting location of a controller in a head-mounted information processing apparatus according to a fourth embodiment of the present invention. As shown in FIG. 21, the user may use the controller 3 in a state of being wrapped around a hand (back or palm position) instead of the wrist. In this case, although a degree of freedom of the hand is reduced as compared with a case of wrapping it around the wrist, the user can control the direction of the pointing beam by a direction of a palm portion, so that the arm's direction does not need to be changed significantly.

However, in this case, a wrist's rotational axis (arm's direction) and an axial direction of the controller 3 that determines the direction of the pointing beam may not match with each other. Therefore, in order to detect the wrist's rotation, adopted may be a method in which a belt 100 or the like mounting the angular velocity sensor 101 is separately attached to the wrist portion. When the wrist's rotation is detected by the angular velocity sensor 101 of the wrist, control may be performed so as not to change the pointing position of the pointing beam similarly to the case of FIG. 13A or FIG. 13B.

Figure 22:
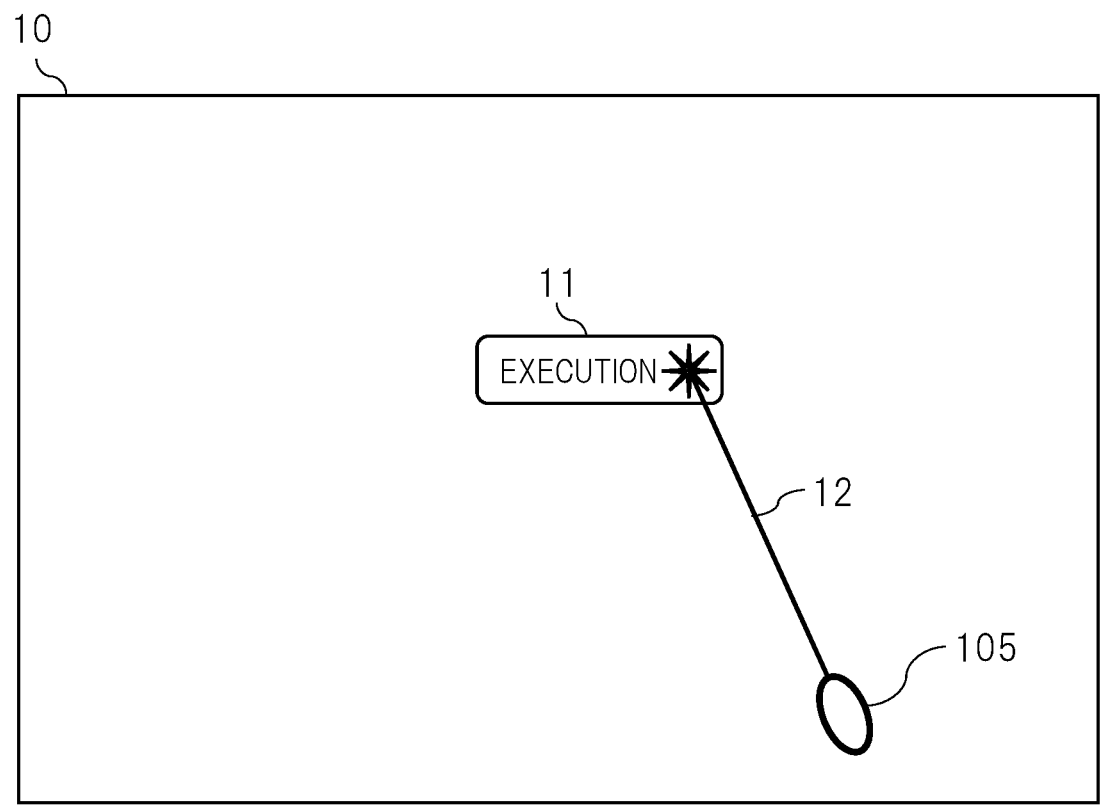
FIG. 22 is a view showing an example of an image displayed on a display in the head-mounted information processing apparatus of FIG. 21.

FIG. 22 is a view showing an example of an image displayed on a display in the head-mounted information processing apparatus of FIG. 21. When the controller 3 is attached at a location as shown in FIG. 21, a hand's position becomes a starting point of the pointing beam, so that the starting point may be moved by moving the hand. In this case, it is desirable to display a position 105 of the starting point as shown in FIG. 22. The hand's position can be detected by using the acceleration sensor 30 in the controller 3. Incidentally, here, the user uses the controller 3 in a state of being wrapped around the hand, but in some cases, the user may use the controller 3 in a state of being wrapped around a finger(s).

Modification Example

User Coordinate System

Figure 23:
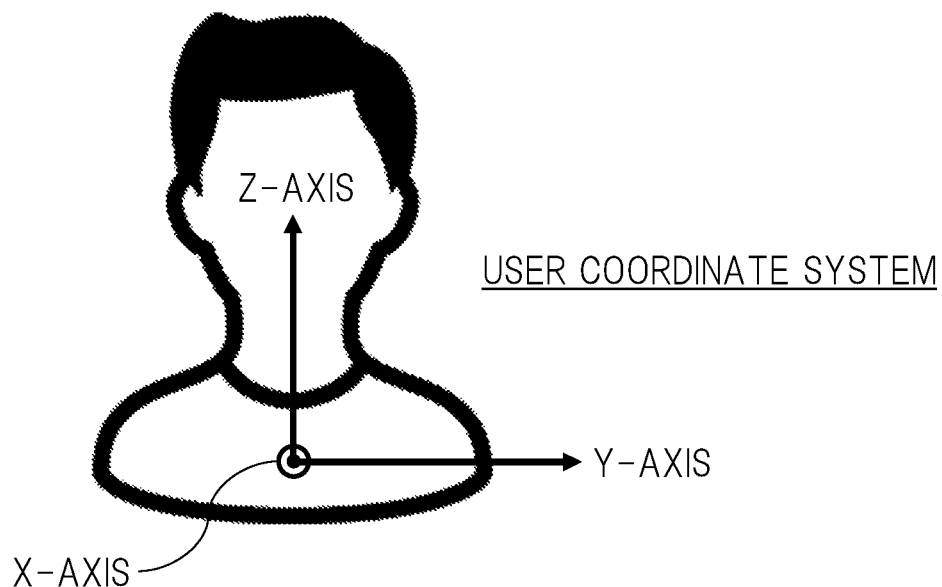
FIG. 23 is a view showing a modification example of a user coordinate system in the head-mounted information processing apparatus according to the fourth embodiment of the present invention.

FIG. 23 is a view showing a modification example of the user coordinate system in the head-mounted information processing apparatus according to the fourth embodiment of the present invention. The user coordinate system may be a coordinate system fixed to a user's body as shown in FIG. 23 besides a coordinate system fixed to the main body device 2 as shown in FIG. 10. In an example of FIG. 23, a front, horizontal direction of the body is an X-axis, a left-hand direction of the user in a horizontal plane is a Y-axis, and a vertical direction is a Z-axis.

A position relationship between the main body device 2 and the body can be detected by, for example, imaging (capturing) the body with the camera 40 etc. of the main body device 2 and performing image analysis. Alternatively, detection can be performed by separately installing an attitude sensor on the body. The pointing position of the pointing beam is controlled by the arm's direction, so that in this way, displaying the pointing beam with reference to the coordinate system fixed to the body make it possible to perform the control so as to further fit a user's sense.

Fifth Embodiment

<<Another Modification Example in HMD>>
<<Composite Sensor>>

For example, in FIG. 5, a combination of the detected result of the gyro sensor 31 mounted on the controller 3 and the captured image of the camera 20 also makes it possible to control the pointing position of the pointing beam. Specifically, for example, the controller 3 detects a direction of the feature point on the hand's back (or may be the palm) based on the image captured by the camera 20 and detects, by an image processing, a directional change amount of the above-mentioned feature point from the reference point.

Then, the directional detector 91 of FIG. 6B outputs, to the operation instruction converter 87, a direction in which the hand's direction detected on the basis of the captured image of the camera 20 is added to the direction of the controller 3 detected on the basis of the detected result of the position/attitude sensor 5.

Consequently, the display controller 88 controls the pointing position of the pointing beam on the assumption that the controller coordinate system has been rotated by an amount in which the directional change amount of the feature point of the hand is added to a directional change amount of the arm.

As a detailed processing content, for example, the directional detector 91 of FIG. 6B uses the changed rotation of the controller coordinate system as $q_{CSM}$ instead of the rotation $q_{CS}$ calculated by Equation (14). In the controller coordinate system, if it is assumed that a unit direction vector of the feature point on the hand's back at the reference position is $n_{H0}$ and a unit direction vector of the feature point sequentially detected on the basis of the image captured by the camera 20 is $n_H$, rotation $q_H$ from the reference position is obtained from Equation (30) by using the normalized quaternion R ($n_1$, $n_2$) of Equation (6). This rotation $q_H$ is calculated by using, for example, the CPU 22 of the controller 3 and is transmitted to the main body device 2.

$$q_H = R(n_{H0}, n_H) \quad (30)$$

The rotation $q_H$ is a representation in the controller coordinate system, and is represented by rotation $q_{HS}$ of Equation (31) in the initial coordinate system. Consequently, the rotation $q_{CSM}$ of the modified controller coordinate system is obtained from Equation (32) by adding the rotation $q_{HS}$ to the rotation $q_{CS}$. The directional detector 91 calculates Equations (31) and (32) by using, for example, the rotation $q_{CS}$ calculated by itself according to the wrist's rotation and the rotation $q_H$ received from the controller 3, thereby obtaining the rotation $q_{CSM}$.

$$q_{HS} = q_{CS} q_H q_{CS} \quad (31)$$

$$q_{CSM} = q_{HS} q_{CS} = q_{CS} R(n_{H0}, n_H) \quad (32)$$

By using such a composite sensor, the user can operate the pointing position of the pointing beam as if the controller 3 is installed on the hand's back with the controller 3 worn on the wrist. Consequently, the user is freed from hassle of installing the controller 3 on the hand's back, and can operate the pointing position of the pointing beam by combining the arm's direction and the hand's direction without moving the arm so much. As a result, the user's convenience can be improved.

<<Control of Rotational Angle of Pointing Beam>>

In the example of FIG. 9 described above, the case where the angle change amount a of the controller 3 and the angle change amount a of the pointing beam are the same is illustrated, but the angle change amount of the pointing beam may be larger or smaller than the angle change amount of the controller 3. Consequently, the user can, for example, operate the pointing position of the pointing beam while suppressing the arm's movement, or finely control the pointing position. As a result, the user's convenience can be improved.

As a detailed processing content, for example, the display controller 88 of FIG. 6B multiplies the angle change amount of the controller 3 by a coefficient to control the angle change amount of the pointing position of the pointing beam. Specifically, the display controller 88 set w as a positive coefficient to use rotation $q_{CSm}$ instead of the rotation $q_{CS}$ and to control the pointing position of the pointing beam, the rotation $q_{CSm}$ being obtained by changing the angle change amount w times like Equation (34). In Equation (34), the angle change amount represented by the rotation $q_{CS}$ is A, and the angle change amount A can be obtained from Equation (33) by using the real part of the rotation $q_{CS}$. Incidentally, $\cos^{-1}$ in Equation (33) takes a value from 0 to $\pi$.

$$|\lambda| = 2 \cos^{-1}(Sc(q_{CS})) \quad (33)$$

$$q_{CSm} = \cos(w|\lambda|/2) + \sin(w|\lambda|/2) Vc(q_{CS})/\sin(|\lambda|/2) \quad (34)$$

<<Timeout Function>>

In switching use/non-use of the controller 3 (that is, on/off), an explicit switch or the like may be provided, but a function for automatically switching on/off may also be provided. Specifically, for example, when the trigger instruction from the operation instruction converter 87 is not issued for a certain period of time, the main body device 2 invalidates the input from the controller 3 as a timeout. Thereafter, in resuming the input from the controller, for example, the main body device causes the user to issue an initialization command.

For example, when an application such as work support is being executed, the user may rotate the wrist or the like without intending to issue a trigger instruction (command). At this time, inconvenience may occur if the rotation or the like of the wrist is interpreted as the trigger instruction. Therefore, the main body device 2 invalidates the input from the controller 3 when the trigger instruction is not issued for the certain period of time. Consequently, the convenience of the user can be improved.

Incidentally, the present invention is not limited to the above-described embodiments, and includes various modification examples. For example, the above-described embodiments have been described in detail in order to explain the present invention in an easy-to-understand manner, and is not necessarily limited to the one including all the described configurations. Further, a part of the configuration of one embodiment may be replaced with the configuration of another embodiment, and the configuration of another embodiment may be added to the configuration of one embodiment. Furthermore, a part of the configuration of each embodiment may be added/deleted/replaced to/from/with other configurations.

Further, each of the above-mentioned configurations, functions, processors, processing means, and the like may be realized by hardware by designing or the like a part or all of them by, for example, an integrated circuit. Furthermore, each of the above-mentioned configurations, functions, and the like may be realized by software by the processor interpreting and executing a program for realizing each function. Information such as programs, tables, and files for realizing each function can be stored in a recording device such as a memory, a hard disk, or an SSD (Solid State Drive), or a recording medium such as an IC card, an SD card, or a DVD.

In addition, control lines and information lines indicate those that are considered necessary for explanation, and do not necessarily indicate all the control lines and information lines in the product. In practice, almost all configurations may be considered to be interconnected.

EXPLANATION OF REFERENCE NUMERALS

1: Head-mounted information processing apparatus (HMD); 2: Main body device; 3, 3a, 3b: Controller; 5: Position/attitude sensor; 10: Image; 11: Object; 12: Pointing beam; 15: Direction of controller; 16a: Directional operation; 16b: Rotational operation; 16c: Protruding operation; 17, 18: Object; 20: Camera; 21: Distance measuring sensor; 22: CPU; 23: Memory; 24: Proximity communication interface; 25: Antenna; 26: Bus; 30: Acceleration sensor; 31: Gyro sensor; 32: Geomagnetic sensor; 35: Program; 36: Information data; 40: Camera; 41: Distance measuring sensor; 42: Display; 43: Audio output unit; 44: Microphone; 45: Position/Attitude Sensor; 46: CPU; 47: Memory; 48: Communication Interface; 49: Antenna; 50: Proximity Communication Interface; 51: Antenna; 52: Bus; 55: Speaker; 56: Earphone; 60: Acceleration Sensor; 61: Gyro sensor; 62: Geomagnetic sensor; 63: GPS receiver; 65: Program; 66: Information data; 66a: Coordinate system information; 66b: Operation instruction information, 70: Control unit; 75: Sensor data processor; 76: Communication controller; 80: Control unit; 85: Communication controller; 86: Sensor data processor; 87: Operation instruction converter; 88: Display controller; 89: Display adjuster; 91: Directional detector; 92: Rotational detector; 93: Origin coordinate detector; 94: Protrusive detector; 100: Belt; 101: Angular velocity sensor; 105: Starting point; and 110: Controller.

The invention claimed is:

1. A head-mounted information processing apparatus having a main body device that is used in a state of being worn on a user's head, and a controller that controls the main body device, the apparatus comprising:
the controller including:
a proximity communication interface that communicates with the main body device; and
a position/attitude sensor that detects a position/attitude of the controller;
the main body device including:
a proximity communication interface that communicates with the controller; and
a display that displays a predetermined image; and
the controller or the main body device including:
a directional detector that detects a direction of the controller by calculation based on a detected result of the position/attitude sensor;
a rotational detector that detects rotation of the controller by calculation based on the detected result of the position/attitude sensor, the direction of the controller being used as a rotational axis regarding the rotation of the controller; and
an operation instruction converter that converts a detected result of the directional detector and a detected result of the rotational detector into instructions for the main body device,
wherein the main body device has a display controller that displays a pointing point of a pointing beam or a cursor on the display, controls the pointing position in response to a movement instruction, and controls an object pointed to by the pointing position according to a trigger instruction,
wherein the operation instruction converter issues the movement instruction based on the direction of the controller that is detected by the directional detector,
wherein the operation instruction converter issues the trigger instruction in a case where a rotational amount of the rotation of the controller detected by the rotational detector exceeds a first rotational threshold value,
wherein the operation instruction converter issues a rotation starting notification in a case where the rotational amount exceeds a second rotational threshold value that is a value smaller than the first rotational threshold value, and
wherein the display controller changes the object, pointed to by the pointing position, into a provisionally selected state, in a case of receiving the rotation starting notification, and in a case of receiving the trigger instruction, changes the object from the provisionally selected state to a selected state regardless of whether the pointing position at a time of receiving the trigger instruction points to the object in the provisionally selected state.

2. The head-mounted information processing apparatus according to claim 1,
wherein the operation instruction converter issues a drag-and-drop starting instruction when a rotated state of the controller is maintained, and issues a drag-and-drop ending instruction when the rotated state is originally returned, and
wherein the display controller moves the position of the object pointed to by the pointing position according to the movement instruction issued in a period from the drag-and-drop starting instruction to the drag-and-drop ending instruction.

3. The head-mounted information processing apparatus according to claim 1,
wherein the controller or the main body device further includes a protrusive detector that detects movement of the controller directed to a direction of the rotational axis by calculation based on the detected result of the position/attitude sensor, and
wherein the operation instruction converter further converts, into another trigger instruction for the main body device, the movement of the controller detected by the protrusive detector.

4. The head-mounted information processing apparatus according to claim 1,
wherein the main body device invalidates an input from the controller when the trigger instruction from the operation instruction converter is not issued for a certain period of time.

5. The head-mounted information processing apparatus according to claim 1,
wherein the controller includes:
a 3-axis angular velocity sensor that is one type of the position/attitude sensor; and
a camera that captures the user's hand, and
wherein the directional detector outputs, to the operation instruction converter, a direction in which a hand's direction detected based on a captured image of the camera is added to the direction of the controller detected based on the detected result of the position/attitude sensor.

6. The head-mounted information processing apparatus according to claim 1,
wherein the controller is a watch-type portable information terminal.

7. A controlling method of a head-mounted information processing apparatus having a main body device that is used in a state of being worn on a user's head and a controller that controls the main body device, the controller having a proximity communication interface that communicates with the main body device, and a position/attitude sensor that detects a position/attitude of the controller, and the main body device having a proximity communication interface that communicates with the controller, and a display that displays a predetermined image, the controlling method comprising:

a first step of detecting a direction of the controller by calculation based on a detected result of the position/attitude sensor;

a second step of detecting rotation of the controller by calculation based on the detected result of the position/attitude sensor, the direction of the controller being used as a rotational axis regarding the rotation of the controller;

a third step of converting, into instructions for the main body device, a detected direction and rotation of the controller, wherein the main body device has a display controller that displays a pointing point of a pointing beam or a cursor on the display, controls the pointing position in response to a movement instruction, and controls an object pointed to by the pointing position according to a trigger instruction, wherein the movement instruction is issued based on the detected direction of the controller, wherein the trigger instruction is issued in a case where a rotational amount of the detected rotation of the controller exceeds a first rotational threshold value, wherein a rotation starting notification is issued in a case where the rotational amount exceeds a second rotational threshold value that is a value smaller than the first rotational threshold value, and wherein the display controller changes the object, pointed to by the pointing position, into a provisionally selected state, in a case of receiving the rotation starting notification, and in a case of receiving the trigger instruction, changes the object from the provisionally selected state to a selected state regardless of whether the pointing position at a time of receiving the trigger instruction points to the object in the provisionally selected state.

\* \* \* \* \*